US012769796B2

(12) United States Patent
Rao et al.

(10) Patent No.: US 12,769,796 B2
(45) Date of Patent: Oct. 20, 2026

(54) METHOD FOR MANAGING NETWORK DEVICE AND APPARATUS

(71) Applicant: HUAWEI TECHNOLOGIES CO., LTD., Shenzhen (CN)

(72) Inventors: Jiading Rao, Nanjing (CN); Huangxun Chen, Shenzhen (CN); Ying Wang, Beijing (CN); Li Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/900,017

(22) Filed: Sep. 27, 2024

(65) Prior Publication Data

US 2025/0021607 A1 Jan. 16, 2025

Related U.S. Application Data

(63) Continuation of application No. PCT/CN2023/070449, filed on Jan. 4, 2023.

(30) Foreign Application Priority Data

Mar. 31, 2022 (CN) ......................... 202210346763.6

(51) Int. Cl.
*G06F 16/906* (2019.01)

(52) U.S. Cl.
CPC .................................. *G06F 16/906* (2019.01)

(58) Field of Classification Search
CPC .................................................... G06F 16/906
USPC .......................................................... 707/738
See application file for complete search history.

(56) References Cited

U.S. PATENT DOCUMENTS

| | | | | |
|---|---|---|---|---|
| 8,296,400 | B2 | 10/2012 | Gorthy et al. | |
| 8,913,519 | B2 * | 12/2014 | Bevemyr | H04L 41/0816 370/253 |
| 10,200,248 | B1 * | 2/2019 | Jiang | H04L 41/0879 |
| 10,516,761 | B1 * | 12/2019 | A | H04L 41/22 |
| 10,725,800 | B2 * | 7/2020 | Sawal | G06F 9/453 |
| 10,992,543 | B1 | 4/2021 | Rachamadugu et al. | |
| 11,115,272 | B1 * | 9/2021 | Kumar | H04L 41/22 |

(Continued)

FOREIGN PATENT DOCUMENTS

| | | | |
|---|---|---|---|
| CN | 1523814 | A | 8/2004 |
| CN | 111723036 | A | 9/2020 |

(Continued)

OTHER PUBLICATIONS

Martinez, A., et al., "Applying Information Extraction for Abstracting and Automating CLI-Based Configuration of Network Devices in Heterogeneous Environments", Studies in Computational Intelligence, vol. 607, Springer Cham Heidelberg, © 2015, pp. 167-193.*

(Continued)

*Primary Examiner* — Robert Stevens
(74) *Attorney, Agent, or Firm* — Fish & Richardson P.C.

(57) ABSTRACT

Example methods and apparatus for managing a network device are described. One example method includes obtaining a static dataset and generating a knowledge corpus based on the static dataset, where the knowledge corpus includes information for managing a network device. The static dataset indicates how to manage the network device, and the static dataset includes data that is generated independent of a device interaction process.

20 Claims, 8 Drawing Sheets

(56) References Cited

U.S. PATENT DOCUMENTS

| | | | | |
|---|---|---|---|---|
| 11,115,278 | B2 * | 9/2021 | Notari | H04L 41/0661 |
| 11,296,954 | B2 * | 4/2022 | A | H04L 41/145 |
| 2013/0073486 | A1 * | 3/2013 | Petrick | H04L 41/22 706/12 |
| 2014/0280875 | A1 | 9/2014 | Narayanan et al. | |
| 2017/0109356 | A1 * | 4/2017 | Sawal | G06F 9/453 |
| 2020/0274766 | A1 * | 8/2020 | Notari | H04L 41/0886 |
| 2020/0412763 | A1 * | 12/2020 | Mercian | H04L 63/101 |
| 2021/0035022 | A1 * | 2/2021 | Cai | G06N 20/00 |
| 2022/0078071 | A1 * | 3/2022 | Agapitos | H04L 41/16 |
| 2023/0161561 | A1 * | 5/2023 | Ghosh | G06F 8/10 717/104 |

FOREIGN PATENT DOCUMENTS

| | | | |
|---|---|---|---|
| EP | 3716534 | A1 | 9/2020 |
| JP | 2022047365 | A | 3/2022 |

OTHER PUBLICATIONS

Wallin, Stefan, et al., "Automating Network and Service Configuration Using NETCONF and YANG", LISA '11: Proc. of the 25th Int'l. Conf. on Large Installation System Administration, USENIX Ass'n, Berkeley, CA, Dec. 2011, 13 pages.*

Shafer, P., "RFC 6244: An Architecture for Network Management Using NETCONF and YANG", Internet Engineering Task Force, Request for Comments: 6244, ISSN: 2070-1721, Jun. 2011, pp. 1-30.*

Deca, Rudy, et al., "Configuration Model for Network Management", In: Gaiti et al.(eds.), Network Control and Engineering for QoS, Security and Mobility, III, NetCon 2004, IFIP International Federation for Information Processing, vol. 165. Springer, Boston, MA, conference held Nov. 2-5, 2004, pp. 3-14.*

Chen, Huangxsun, et al., "Software-Defined Network Assimilation: Bridging the Last Mile Towards Centralized Network Configuration Management with NAssim", SIGCOM '22, Amsterdam, The Netherlands, Aug. 22-26, 2022, pp. 281-297.*

European Search Report in European Appln. No. 23777564.8, mailed on May 9, 2025, 9 pages.

Bjorklund et al., "The YANG 1.1 Data Modeling Language," Internet Engineering Task Force (IETF), RFC7950, Aug. 2016, 217 pages.

Enns et al., "Network Configuration Protocol (NETCONF)," Internet Engineering Task Force (IETF), RFC6241, Jun. 2011, 113 pages.

International Search Report and Written Opinion in International Appln. No. PCT/CN2023/070449, mailed on May 22, 2023, 15 pages (with English translation).

* cited by examiner

METHOD FOR MANAGING NETWORK DEVICE AND APPARATUS

CROSS-REFERENCE TO RELATED APPLICATIONS

This application is a continuation of International Application No. PCT/CN2023/070449, filed on Jan. 4, 2023, which claims priority to Chinese Patent Application No. 202210346763.6, filed on Mar. 31, 2022. The disclosures of the aforementioned applications are hereby incorporated by reference in their entireties.

TECHNICAL FIELD

This application relates to the field of device management technologies, and in particular, to a method for managing a network device and an apparatus.

BACKGROUND

During management and maintenance for a network device, a network controller or a network management system interacts with the network device through a management interface supported by the network device. Generally, there are a plurality of types and models of network devices in a network, and the network controller needs to support management interfaces for the plurality of types of network devices. If the network controller in the network does not support a management interface for a specific type of network device, a version of the network controller needs to be upgraded to support the management interface for the network device, so that the network controller can manage and maintain the network device. At present, generation of management interfaces depends on data for guiding management and maintenance for network devices, and the data depends on data generated through interaction with the network devices. Consequently, there is strong dependency on interaction with the network devices, affecting efficiency of managing the network devices.

SUMMARY

This application provides a method for managing a network device and an apparatus. This application is conducive to improving efficiency of managing a network device. Technical solutions provided in this application are as follows.

According to a first aspect, this application provides a method for managing a network device. The method for managing a network device includes: obtaining a static dataset, where the static dataset is used to indicate how to manage a network device, and the static dataset includes data that is generated independent of a device interaction process; and generating a knowledge corpus based on the static dataset, where the knowledge corpus is used to manage the network device.

Because the data used for generating the knowledge corpus does not need to be obtained through device interaction, feasibility and efficiency of obtaining the data used for generating the knowledge corpus are improved, and feasibility and efficiency of generating the knowledge corpus are correspondingly improved. Because the knowledge corpus is used to manage the network device, efficiency of managing the network device is also improved.

Optionally, the static dataset includes any one or more of the following: a configuration guide, a technical guide, a technical white paper, a design document, and command modeling data of the network device.

The knowledge corpus includes command templates and template relationship information, the command template is used to describe a command for managing the network device, and the template relationship information describes relationships between a plurality of command templates.

In a feasible implementation, the command template includes one or more of the following: a command name, a command line, a command function description, a configuration instance, a working view of the command line, a definition of a parameter in the command line, and a format of a disabling command line of the command line. The definition of the parameter includes a function definition, a type constraint, and a value constraint of the parameter.

Optionally, after the knowledge corpus is checked and/or used, if it is determined that checked and/or used content is correct, a check indicator may be further added to corresponding content, to indicate that verification has been performed on the corresponding content. For example, the command template may further have a first check indicator, and the first check indicator indicates whether the command template has been checked. In an implementation, the first check indicator may indicate that verification on the corresponding content succeeds. Alternatively, the first check indicator may indicate that verification on the corresponding content succeeds or fails.

The relationships described by the template relationship information include a parent-child relationship between a first command line in a first command template and a second command line in a second command template.

Further, when the relationships described by the template relationship information include the parent-child relationship, the relationships described by the template relationship information may further include that two command lines having a same parent command line have a same working view.

In a feasible implementation, the parent-child relationship may be represented by using a first tree structure, two first nodes in the first tree structure that have a connection relationship represent the first command line and the second command line, and based on a direction of the first tree structure, a command line represented by an anterior first node in the two first nodes is a parent command line and a command line represented by a posterior first node in the two first nodes is a child command line. The parent-child relationship is represented by using the first tree structure, so that the parent-child relationship can be visually presented, and the parent-child relationship is more easily understood.

Optionally, the relationships described by the template relationship information further include an association relationship in which a third command line in a third command template and a fourth command line in a fourth command template have a same field prefix.

In a feasible implementation, the association relationship may be represented by using a second tree structure, two second nodes in the second tree structure that have a connection relationship represent one field in the third command line and one field in the fourth command line or represent two adjacent fields in the third command line or the fourth command line, and the field includes a keyword and/or a parameter; and when a tree branch representing the third command line and a tree branch representing the fourth command line have a shared node and non-shared nodes, based on a direction of the second tree structure, a field represented by a shared node before all the non-shared nodes is the same field prefix of the third command line and the fourth command line.

Optionally, a first target node in the second tree structure further has first label information, and the first label information indicates any one or more of the following: the first target node has a sibling node, and the first target node has a subsequent branch.

The association relationship is represented by using the second tree structure, so that the association relationship can be visually presented, and the association relationship is more easily understood.

After the knowledge corpus is checked and/or used, if it is determined that checked and/or used content is correct, a check indicator may be further added to corresponding content, to indicate that verification has been performed on the corresponding content. For example, the template relationship information has a second check indicator, and the second check indicator indicates whether the template relationship information has been checked. In an implementation, the second check indicator may indicate that verification on the corresponding content succeeds. Alternatively, the second check indicator may indicate that verification on the corresponding content succeeds or fails.

Optionally, the knowledge corpus further includes a graph model, and the graph model is used to graphically reflect content of the command template. The content of the command template is visually presented by using the graph model, so that the command template can be easily understood. It should be noted that the knowledge corpus may be alternatively visually presented in another manner. For example, the command template may be alternatively visually presented by using a table structure of a database.

The graph model includes a plurality of nodes that have a connection relationship. The plurality of nodes are obtained through mapping respectively by using a plurality of fields in a command line in the command template reflected by the graph model. A connection relationship between a third node and a fourth node in the graph model is obtained based on a relationship between fields mapped to the third node and the fourth node. The field includes a keyword and/or a parameter. In this way, a syntax structure of the command line can be represented by using the graph model, that is, the content of the command template is graphically reflected.

Optionally, a second target node in the graph model further has second label information, and the second label information indicates any one or more of the following: constraints of a parameter mapped to the second target node, and a format of a disabling command line of a command line in which a field mapped to the second target node is located. The constraints of the parameter include a type constraint and/or a value constraint of the parameter. Further, the second label information may further indicate one or more of the following: a command function description, a configuration instance, a working view of a command line, and a function definition of the parameter. Optionally, the second label information may always be displayed in the graph model. Alternatively, to ensure a visual effect of the graph model, second label information of a node may be displayed on the node when the node in the graph model is selected, and the second label information of the node may not be displayed when the node is not selected.

The graph model is visual presentation of the command template, and the configuration instance is a result obtained by instantiating the parameter in the command line. Therefore, the following correspondence further exists between a graph model and a configuration instance: Fields in the configuration instance are in a one-to-one correspondence with fields mapped to nodes in a specified branch of the graph model. A plurality of fields in the configuration instance are arranged according to a sequence of a plurality of corresponding nodes in the specified branch. The fields in the configuration instance include a keyword and/or a parameter value, and the fields in the graph model include a keyword and/or a parameter. The keyword in the configuration instance is the same as the keyword mapped to a corresponding node in the specified branch. The parameter value in the configuration instance satisfies constraints of the parameter mapped to a corresponding node in the specified branch.

In some scenarios, whether a given configuration instance matches a given graph model may be determined based on the correspondence between a configuration instance and a graph model. Alternatively, a plurality of existing graph models may be traversed based on a given configuration instance and the correspondence, to determine, from the plurality of graph models, a graph model that matches the configuration instance. Alternatively, with reference to the correspondence between a configuration instance and a graph model, a configuration instance may be generated based on a known graph model, or a graph model may be generated based on a known configuration instance.

In a feasible implementation, the generating a knowledge corpus based on the static dataset includes: extracting an initial corpus from the static dataset; and performing corpus distillation processing based on the initial corpus, to obtain the knowledge corpus.

The knowledge corpus generated through the foregoing process can be directly put into use. Alternatively, the knowledge corpus may be further improved to obtain a more complete knowledge corpus, and then the more complete knowledge corpus is put into use. In addition, after the knowledge corpus is put into use, the knowledge corpus may be further improved. Therefore, the method may further include: repairing the knowledge corpus. Moreover, the repair may refer to improvement before the knowledge corpus is put into use, or may refer to improvement after the knowledge corpus is put into use.

Optionally, the repairing the knowledge corpus includes: displaying the knowledge corpus; receiving a repair instruction that instructs to repair the knowledge corpus; and performing a repair operation on the knowledge corpus according to the repair instruction. The repair instruction instructs to correct information recorded in a command template in the knowledge corpus, and/or correct a relationship recorded in the template relationship information, and/or correct information represented by a graph model.

In a first repair scenario, the knowledge corpus may be automatically checked, and when a check result indicates that an error occurs in the knowledge corpus, the knowledge corpus is repaired. The repair scenario may occur before or after the knowledge corpus is put into use. In the repair scenario, a computer device that checks the knowledge corpus may generate an error report, where the error report may indicate a location at which an error occurs in the knowledge corpus. In this case, the repair instruction instructs to repair the error indicated by the error report. In addition, the repair instruction may be automatically generated by the computer device configured to repair the knowledge corpus, or may be sent by a repair person. When the repair instruction is sent by the repair person, the computer device may further display the error report indicating that the error occurs in the knowledge corpus, so that the repair person views the error report.

In a second repair scenario, the knowledge corpus may be manually checked, and the knowledge corpus is repaired based on a check result. The repair scenario may occur before or after the knowledge corpus is put into use. A repair person may view the knowledge corpus on a computer device to check accuracy of content in the knowledge corpus, and correct erroneous content when considering that the content is inaccurate. For example, it can be learned from the foregoing content that, when a working view of the second command line is a candidate view that may be entered by a plurality of first command lines during separate execution, the computer device determines, as a parent command line of the second command line, a first command line that is in the plurality of first command lines and that may enter candidate views with a smallest total quantity during execution, and determines other first command lines in the plurality of first command lines as candidate parent command lines of the second command line. In a manual check process, the repair person may modify one of the plurality of candidate parent command lines to the parent command line of the second command line. Alternatively, when considering that none of a plurality of candidate parent commands is a parent command of the second command line, the repair person may further send an instruction of adding a new candidate parent command for the second command line, to modify the newly added candidate parent command to the parent command of the second command line.

In a third repair scenario, the knowledge corpus may be repaired based on a usage feedback on the knowledge corpus. The repair scenario may occur after the knowledge corpus is put into use. In a process of using the knowledge corpus, a user may find an error in the knowledge corpus, and sends the usage feedback to a provider of the knowledge corpus when finding the error. The provider of the knowledge corpus can targetedly repair the knowledge corpus based on the usage feedback.

Optionally, the method for managing a network device further includes: managing the network device based on the knowledge corpus. Because the data used for generating the knowledge corpus does not need to be obtained through device interaction, feasibility and efficiency of obtaining the data used for generating the knowledge corpus are improved, and feasibility and efficiency of generating the knowledge corpus are correspondingly improved. Managing the network device based on the knowledge corpus is conducive to improving efficiency of managing the network device.

In a feasible implementation, the managing the network device based on the knowledge corpus includes: generating a management interface for the network device based on the knowledge corpus; and managing the network device based on the management interface.

Optionally, the management interface includes a YANG interface, a CLI, an SNMP interface, or an HTTP interface.

Optionally, the management interface may be generated based on full content in the knowledge corpus. Alternatively, the management interface is generated based on a part of content in the knowledge corpus. The generating a management interface for the network device based on the knowledge corpus includes: obtaining, from the knowledge corpus based on a filtering criterion, a candidate corpus needed to manage the network device; and generating the management interface based on the candidate corpus. The management interface is generated based on the candidate corpus, so that a volume of data that needs to be processed for generating the management interface can be reduced, and efficiency of managing the network device can be improved.

In a feasible implementation, the filtering criterion is used to indicate one or more of the following: a command name, a command line, a command function description, a working view, and a configuration instance. Optionally, the filtering criterion may be one or more of the following: a command name, a command line, a command function description, a working view, and a configuration instance, or may be a regular expression indicating one or more of the following: a command name, a command line, a command function description, a working view, and a configuration instance.

According to a second aspect, this application provides an apparatus for managing a network device. The apparatus for managing a network device includes: an obtaining module, configured to obtain a static dataset, where the static dataset is used to indicate how to manage a network device, and the static dataset includes data that is generated independent of a device interaction process; and a generation module, configured to generate a knowledge corpus based on the static dataset, where the knowledge corpus is used to manage the network device.

Optionally, the static dataset includes any one or more of the following: a configuration guide, a technical guide, a technical white paper, a design document, and command modeling data of the network device.

Optionally, the knowledge corpus includes command templates and template relationship information, the command template is used to describe a command for managing the network device, and the template relationship information describes relationships between a plurality of command templates.

Optionally, the command template includes one or more of the following: a command name, a command line, a command function description, a configuration instance, a working view of the command line, a definition of a parameter in the command line, and a format of a disabling command line of the command line.

Optionally, the definition of the parameter includes a function definition, a type constraint, and a value constraint of the parameter.

Optionally, the command template has a first check indicator, and the first check indicator indicates whether the command template has been checked.

Optionally, the relationships described by the template relationship information include a parent-child relationship between a first command line in a first command template and a second command line in a second command template.

Optionally, the relationships described by the template relationship information further include that two command lines having a same parent command line have a same working view.

Optionally, the parent-child relationship is represented by using a first tree structure, two first nodes in the first tree structure that have a connection relationship represent the first command line and the second command line, and based on a direction of the first tree structure, a command line represented by an anterior first node in the two first nodes is a parent command line and a command line represented by a posterior first node in the two first nodes is a child command line.

Optionally, the relationships described by the template relationship information further include an association relationship in which a third command line in a third command template and a fourth command line in a fourth command template have a same field prefix.

Optionally, the association relationship is represented by using a second tree structure, two second nodes in the second tree structure that have a connection relationship represent one field in the third command line and one field in the fourth command line or represent two adjacent fields in the third command line or the fourth command line, and the field includes a keyword and/or a parameter; and when a tree branch representing the third command line and a tree branch representing the fourth command line have a shared node and non-shared nodes, based on a direction of the second tree structure, a field represented by a shared node before all the non-shared nodes is the same field prefix of the third command line and the fourth command line.

Optionally, a first target node in the second tree structure further has first label information, and the first label information indicates any one or more of the following: the first target node has a sibling node, and the first target node has a subsequent branch.

Optionally, the template relationship information has a second check indicator, and the second check indicator indicates whether the template relationship information has been checked.

Optionally, the knowledge corpus further includes a graph model, and the graph model is used to graphically reflect content of the command template.

Optionally, the graph model includes a plurality of nodes that have a connection relationship. The plurality of nodes are obtained through mapping respectively by using a plurality of fields in a command line in the command template reflected by the graph model. A connection relationship between a third node and a fourth node in the graph model is obtained based on a relationship between fields mapped to the third node and the fourth node. The field includes a keyword and/or a parameter.

Optionally, a second target node in the graph model further has second label information, and the second label information indicates any one or more of the following: constraints of a parameter mapped to the second target node, and a format of a disabling command line of a command line in which a field mapped to the second target node is located.

Optionally, the command template includes the configuration instance. Fields in a configuration instance are in a one-to-one correspondence with fields mapped to nodes in a specified branch of a graph model. A plurality of fields in the configuration instance are arranged according to a sequence of a plurality of corresponding nodes in the specified branch. The fields in the configuration instance include a keyword and/or a parameter value, and the fields in the graph model include a keyword and/or a parameter. The keyword in the configuration instance is the same as the keyword mapped to a corresponding node in the specified branch. The parameter value in the configuration instance satisfies constraints of the parameter mapped to a corresponding node in the specified branch.

Optionally, the generation module is specifically configured to: extract an initial corpus from the static dataset; and perform corpus distillation processing based on the initial corpus, to obtain the knowledge corpus.

Optionally, the generation module is further specifically configured to repair the knowledge corpus.

Optionally, the generation module is further specifically configured to: display the knowledge corpus; receive a repair instruction that instructs to repair the knowledge corpus; and perform a repair operation on the knowledge corpus according to the repair instruction.

Optionally, the generation module is further specifically configured to display an error report indicating that an error occurs in the knowledge corpus. In this case, the repair instruction instructs to repair the error indicated by the error report.

Optionally, the repair instruction instructs to correct information recorded in a command template in the knowledge corpus, or a relationship recorded in the template relationship information.

Optionally, the apparatus for managing a network device further includes a management module, configured to manage the network device based on the knowledge corpus.

Optionally, the management module is specifically configured to: generate a management interface for the network device based on the knowledge corpus; and manage the network device based on the management interface.

Optionally, the management interface includes a YANG interface, a CLI, an SNMP interface, or an HTTP interface.

Optionally, the management module is specifically configured to: obtain, from the knowledge corpus based on a filtering criterion, a candidate corpus needed to manage the network device, where the filtering criterion is used to indicate one or more of the following: a command name, a command line, a command function description, a working view, and a configuration instance; and generate the management interface based on the candidate corpus.

According to a third aspect, this application provides a network system. The network system includes a network management device and a network device. The network device is configured to provide a network service. The network management device is configured to manage the network device by using the method provided in any one of the first aspect and the possible implementations of the first aspect of this application.

According to a fourth aspect, this application provides a network system. The network system includes a corpus generation device, a network management device, and a network device. The corpus generation device is configured to generate a knowledge corpus by using the method provided in any one of the first aspect and the possible implementations of the first aspect of this application. The network device is configured to provide a network service. The network management device is configured to manage the network device based on the knowledge corpus by using the method provided in any one of the first aspect and the possible implementations of the first aspect of this application.

According to a fifth aspect, this application provides a network management device, including a memory and a processor. The memory stores program instructions, and the processor runs the program instructions to perform the method provided in any one of the first aspect and the possible implementations of the first aspect of this application.

According to a sixth aspect, this application provides a computer device, including a memory and a processor. The memory stores program instructions, and the processor runs the program instructions to perform the method provided in any one of the first aspect and the possible implementations of the first aspect of this application.

According to a seventh aspect, this application provides a computer-readable storage medium. The computer-readable storage medium is a non-volatile computer-readable storage medium, and the computer-readable storage medium includes program instructions. When the program instructions are run on a computer device, the computer device is enabled to perform the method provided in any one of the first aspect and the possible implementations of the first aspect of this application.

According to an eighth aspect, this application provides a computer program product including instructions. When the computer program product runs on a computer, the computer is enabled to perform the method provided in any one of the first aspect and the possible implementations of the first aspect of this application.

DESCRIPTION OF EMBODIMENTS

To make objectives, technical solutions, and advantages of this application clearer, the following further describes implementations of this application in detail with reference to the accompanying drawings.

Figure 1:
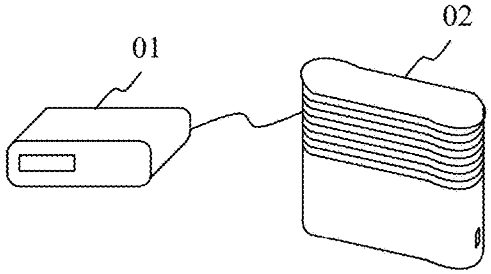
FIG. 1 is a schematic diagram of an application scenario related to a method for managing a network device according to an embodiment of this application.

FIG. 1 is a schematic diagram of an application scenario related to a method for managing a network device according to an embodiment of this application. As shown in FIG. 1, the application scenario includes a network management device 01 and a network device 02. A communication connection is established between the network management device 01 and the network device 02. The network management device 01 and the network device 02 may be deployed in one local area network, or may be deployed in different local area networks. Alternatively, the network management device 01 may be deployed in a public cloud or a private cloud.

The network device 02 is a physical entity connected to a network, and is configured to provide a network service. Optionally, the network device 02 may provide services such as network access and/or traffic control. In a feasible implementation, the network device 02 may be a device, like a switch, a router, a gateway, a firewall, a bridge, or a network adapter.

The network management device 01 is configured to manage the network device 02. Optionally, that the network management device 01 manages the network device 02 includes: The network management device 01 configures functions for the network device 02, and/or the network management device 01 queries for functions of the network device 02 and the like. In an implementation, the network management device 01 may be a network device like a network controller, or may be a support system like an operations support system (OSS), a management support system (MSS), or a business support system (BSS). These support systems may be implemented by using a computer device. In addition, the computer device may be implemented by using one or more of the following: a terminal, a physical machine, a cloud server, or a bare metal server. The computer device can be understood as one device, or can be understood as a device cluster including a plurality of devices. Moreover, a computing capability of the computer device may be implemented by the computer device or software deployed on the computer device. For example, the computing capability may be implemented by a virtual machine, a container, or the like deployed on the computer device. Alternatively, when the computer device is implemented by using the device cluster including a plurality of devices, the plurality of devices may be devices of a same type, or may be devices of different types. This is not specifically limited in embodiments of this application.

In the application scenario, the network management device 01 can further generate a knowledge corpus based on a static dataset, and manage the network device 02 based on the knowledge corpus. Data in the static dataset is used to guide management for the network device 02, and the static dataset includes data that is generated independent of a device interaction process. Data generated dependent on the device interaction process is data that can be obtained only through interaction between configuration personnel and a device. For example, during configuration of an internet protocol version 4 (IPv4) border gateway protocol (BGP) peer, a command line used for performing the configuration operation can be determined only by manually querying a configuration device many times. In contrast, the static dataset directly indicates the command line used for performing the configuration operation, without manually querying the device for the command line. Therefore, the static dataset becomes the data that is generated independent of the device interaction process.

Figure 2:
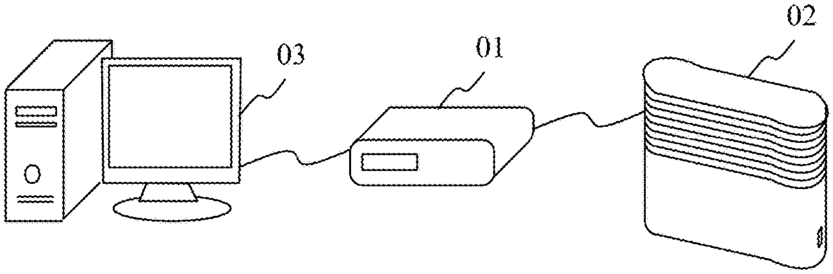
FIG. 2 is a schematic diagram of another application scenario related to a method for managing a network device according to an embodiment of this application.

FIG. 2 is a schematic diagram of another application scenario related to a method for managing a network device 02 according to an embodiment of this application. As shown in FIG. 2, the application scenario includes a computer device 03, a network management device 01, and a network device 02. Communication connections are established between the computer device 03 and the network management device 01, and between the network management device 01 and the network device 02. For the network management device 01 and the network device 02 in the application scenario, refer to related descriptions in the application scenario shown in FIG. 1. Details are not described herein again.

The computer device 03 can provide a computing capability. Optionally, the computer device 03 may be implemented by using one or more of the following: a terminal, a physical machine, a cloud server, or a bare metal server. The computer device 03 can be understood as one device, or can be understood as a device cluster including a plurality of devices. Moreover, the computing capability of the computer device may be implemented by the computer device 03 or software deployed on the computer device 03. For example, the computing capability may be implemented by a virtual machine, a container, or the like deployed on the computer device 03. Alternatively, when the computer device 03 is implemented by using the device cluster including a plurality of devices, the plurality of devices may be devices of a same type, or may be devices of different types. This is not specifically limited in embodiments of this application.

In the application scenario, the computer device 03 can generate a knowledge corpus based on a static dataset by using the computing capability of the computer device 03. The network management device 01 can manage the network device 02 based on the knowledge corpus. Data in the static dataset is used to guide management for the network device 02, and the static dataset includes data that is generated independent of a device interaction process.

In this embodiment of this application, the generated knowledge corpus may have a plurality of use scenarios. The following describes the plurality of use scenarios by using two examples as follows:

In a use scenario, the knowledge corpus can be provided for a user in a form of a resource library. For example, when the user needs to manage the network device 02, a service provider may provide the user with the knowledge corpus including related data of the network device 02, so that the user manages the network device 02 based on the knowledge corpus.

In another use scenario, a service provider may provide a user with a service for managing the network device 02. In addition, the knowledge corpus needs to be used in a process of managing the network device 02. For example, when the user needs to perform configuration for the network device 02 owned by the user, the user may use the service. The service provider may perform configuration for the network device 02 of the user based on the knowledge corpus by using the service.

It should be understood that the foregoing content is examples for describing the application scenarios of the method for managing a network device provided in embodiments of this application, and does not constitute any limitation on application scenarios of the method for managing a network device. A person of ordinary skill in the art can learn that, as service requirements change, the application scenarios of the method for managing a network device may be adjusted based on application requirements, and are not enumerated one by one in embodiments of this application.

Figure 3:
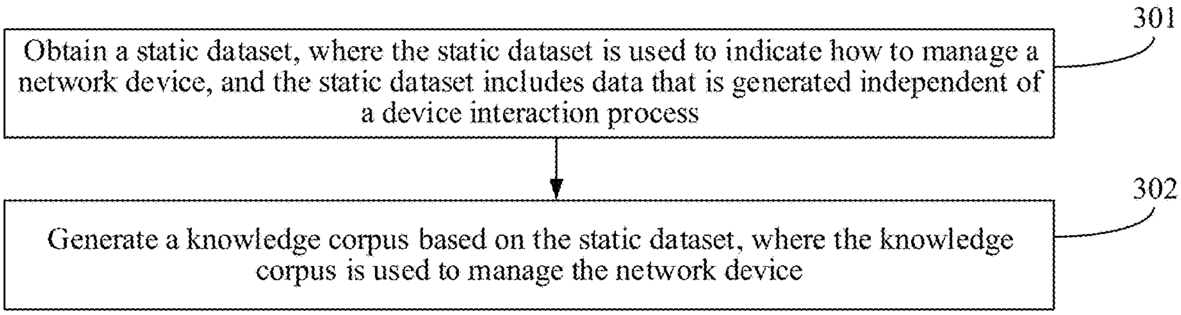
FIG. 3 is a flowchart of generating a knowledge corpus according to an embodiment of this application.

The following describes an implementation process of the method for managing a network device provided in embodiments of this application. The method for managing a network device may include two processes: a process of generating a knowledge corpus, and a process of managing a network device based on the knowledge corpus. The following separately describes the two processes. As shown in FIG. 3, the implementation process of generating the knowledge corpus may include the following steps.

Step 301: Obtain a static dataset, where the static dataset is used to indicate how to manage a network device, and the static dataset includes data that is generated independent of a device interaction process.

The static dataset is a set of data that guides management for the network device. In this embodiment of this application, the static dataset includes the data that is generated independent of the device interaction process. In this case, because the data used for generating the knowledge corpus does not need to be obtained through device interaction, feasibility and efficiency of obtaining the data used for generating the knowledge corpus are improved, and feasibility and efficiency of generating the knowledge corpus are correspondingly improved. This is conducive to improving efficiency of managing the network device.

The static dataset may be an offline or semi-structured information source. Structured information is information that can be represented by data or a unified structure, such as information in a relational database and an object-oriented database. Unstructured information is information that cannot be represented by a numeral or a unified structure, such as audio and image files. Semi-structured data is information between structured information and unstructured information. Semi-structured information is a form of structured information that does not obey data model structures associated with relational databases or other forms of data tables, but contains related tags to separate semantic elements and enforce hierarchies of records and fields. Optionally, the static dataset includes any one or more of the following: a configuration guide, a technical guide, a technical white paper, a design document, and command modeling data of the network device. The command modeling data is data output by an apparatus that is configured to perform modeling based on the data in the static dataset.

The static dataset includes a plurality of command subsets (also referred to as commands). One command is corresponding to one function of the network device, that is, one command is used to manage one function of the network device. For example, one command is used to guide configuration of one function of the network device. A command includes information indicating one or more of the following: a command name, a command line, a command function description, a configuration instance, a working view of the command line, a definition of a parameter in the command line, and a format of a disabling command line of the command line. One command includes one or more command lines. A command line is also referred to as a command line interface (CLI). A command line can be executed by the network device, and when the command line is executed by the network device, the command line is used to configure, for the network device, a function corresponding to a command to which the command line belongs. When a command includes a plurality of command lines, the plurality of command lines are all used to configure, for the network device, a function corresponding to the command to which the command lines belong. In addition, the static dataset may further include additional information. The additional information may indicate conditions for using command lines, precautions (such as prerequisites for using the command lines), a procedure to be subsequently executed after execution of the command lines, and the like.

A command line includes one or more fields, and the field may be a keyword and/or a parameter. According to content indicated by the command line, the command line may carry a parameter or may not carry a parameter. A command function description is used to describe a function of the command line in a command. The parameter in the command line is defined. The definition of the parameter includes a function definition, a type constraint, and a value constraint of the parameter. The function definition of the parameter is used to describe a function of the parameter. The type constraint of the parameter is used to indicate a data type of the parameter. The value constraint of the parameter is used to indicate a condition that a value of the parameter needs to satisfy, for example, a range that the value of the parameter needs to satisfy. A configuration instance is a result obtained by instantiating the parameter in the command line.

It can be learned from the foregoing content that a command line can be executed by the network device, and when the command line is executed by the network device, the command line is used to configure, for the network device, a function corresponding to a command to which the command line belongs. Generally, during configuration of a function of the network device, the network device may be enabled to have a corresponding function, or a function of the network device may be disabled. Correspondingly, the command line may include an enabling command line and a disabling command line. The enabling command line is used to enable the network device to have a corresponding function, that is, the enabling command line is used to configure the corresponding function for the network device. The disabling command line is used to disable a function of the network device. The disabling command line may also include one or more fields, and the field may be a keyword and/or a parameter. In this embodiment of this application, a format of the disabling command line is used to indicate a writing manner of the disabling command line. For example, when the enabling command line corresponding to the disabling command line carries a keyword and/or a parameter, the format of the disabling command line is used to indicate whether the disabling command line needs to carry the keyword and/or the parameter in the corresponding enabling command line.

When an administrator configures one function of the network device on a computer device, the administrator usually needs to instruct the computer device to sequentially execute a plurality of command lines. In addition, each time one command line is executed, a configuration interface is displayed on a display screen of the computer device. The configuration interface is a view entered by executing the command line. During configuration of one function of the network device, for two command lines that are adjacently executed, if execution of a previous command line causes a view change and the previous command line is not a command line that indicates to return to an upper-level view (for example, a command line "quit"), the two command lines have a parent-child relationship, and a command line that is executed first is a parent command line of a command line that is executed later. For a parent command line and a child command line that have a parent-child relationship, a view displayed after the parent command line is executed is a view that the parent command line enters. This view is also referred to as a working view of the child command line. In addition, when the child command line is a parent command line of another command line, the child command line may be input in the working view of the child command line, to enter a working view of the another command line. Generally, one child command line may have one or more parent command lines. When different parent command lines are executed, different views may be entered. Accordingly, one child command line may have a plurality of working views.

In an example, it is assumed that the static dataset is a configuration guide of the network device. The following content is content of a bgp command in the configuration guide of the network device provided in this embodiment of this application. The configuration guide is written in hypertext markup language (HTMIL). Content after "//" is a comment of content before "//". The command is as follows:

bgp //command name

Function //command function description

The bgp command enables BGP and enter the BGP view or displays the BGP view directly.

The undo bgp command disables BGP.

By default the BGP is disabled.

Format //format bgp as-number //enabling command line, where in command lines, bold fonts indicate keywords, and fonts in italics indicate parameters undo bgp [as-number] //disabling command line Parameters //parameters

| Parameter | Description// function definition | Value//value constraint |
|---|---|---|
| as-number// parameter definition | Specifies a destination AS number | For an integral AS number, the value is an integer ranging from 1 to 4294967295. |

View //working view

Command template view, System view //"Command template view" and "System view" are both working views of the bgp command.

Example //configuration instance

#Create a configuration template named g1 and configure an IPv4 BGP peer (with IP address of 1.1.1.1 and AS number of 100) in the template. //Functions of the configuration instance: create a configuration template named g1 and configure an IPv4 BGP peer (with an IP address of 1.1.1.1 and an AS number of 100) in the template.

<ABC> system-view

[~ABC] command group g1

[~ABC-group-g1] bgp 100

[~ABC-group-g1-bgp] peer 1.1.1.1 as-number 100

[~ABC-group-g1-bgp] quit

[~ABC-group-g1] end-group //specific content of the configuration instance

#Enable BGP and enter the BGP view. //functions of the configuration instance: enable a BGP and enter a BGP view <ABC> system-view

[~ABC] bgp 100 //specific content of the configuration instance

Usage Guidelines //usage guidelines

It can be learned from the content that the bgp command includes information indicating the following content: a command name, a command line, a command function description, a configuration instance, a working view of the command line, a definition of a parameter in the command line, a format of a disabling command line of the command line, and additional information. The bgp command includes two command lines: the enabling command line bgp <as-number> and the disabling command line undo bgp <as-number>. The two command lines each contain a keyword and a parameter. In the enabling command line bgp <as-number>, the keyword is bgp and the parameter is as-number. In the disabling command line undo bgp <as-number>, the keywords are undo and bgp and the parameter is as-number. In both configuration instances provided in the configuration guide, the parameters in the enabling command lines are instantiated to 100. In addition, both the enabling command line and the disabling command line have two working views: the view "Command template view" and the view "System view". In the command line bgp <as-number>, content outside < > represents the keyword of the command line, and content in < > represents the parameter of the command line. All command lines in embodiments of this application are written in this manner.

In the foregoing configuration instance of enabling a BGP and entering a BGP view, it can be learned that "system-view" and "bgp 100" need to be sequentially executed to configure the function, "system-view" is the configuration instance of the command line system-view, and "bgp 100" is the configuration instance of the command line bgp <as-number>. If execution of the command line system-view causes a view change, and the command line system-view is not a command line that indicates to return to an upper-level view, it may be considered that the command line system-view and the command line bgp <as-number> have a parent-child relationship.

Step 302: Generate the knowledge corpus based on the static dataset, where the knowledge corpus is used to manage the network device.

Figure 4:
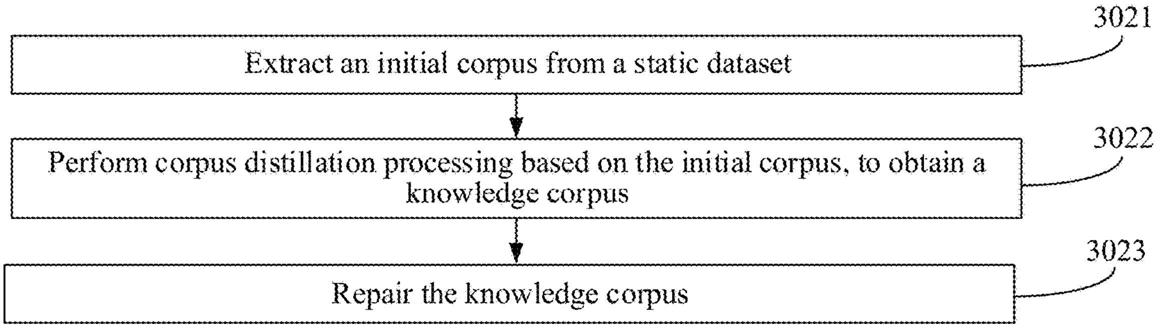
FIG. 4 is a flowchart of generating a knowledge corpus based on a static dataset according to an embodiment of this application.

In step 302, an initial knowledge corpus may be first generated based on the static dataset, and then the initial knowledge corpus is improved to obtain a more complete knowledge corpus. Alternatively, the generated initial corpus may be directly put into use. This is not specifically limited in embodiments of this application. As shown in FIG. 4, an implementation process of generating the initial corpus includes the following step 3021 and step 3022. When the initial knowledge corpus further needs to be improved, the implementation process of step 302 may further include step 3023.

Step 3021: Extract an initial corpus from the static dataset.

After the static dataset is obtained, the data in the static dataset may be parsed, and the initial corpus needed to generate the knowledge corpus may be extracted. Optionally, the initial corpus may include one or more of the following: a command name, a command line, a command function description, a configuration instance, a working view of the command line, a definition of a parameter in the command line, and a format of a disabling command line of the command line. In a feasible implementation, a parser may be used to parse the static dataset, and extract the initial corpus from the static dataset based on a keyword. The parser is used to convert data in a specified format into a specified data structure (for example, JSON). In addition, that the parser extracts the initial corpus from the static dataset may be that the parser directly captures corresponding content from the static dataset based on content needed to generate the knowledge corpus. For example, in this embodiment of this application, the parser is used to convert the data in the static dataset written in HTML into a JSON data structure. Moreover, it is assumed that the content needed to generate the knowledge corpus is: a command name, a command line, a command function description, a configuration instance, a working view of the command line, a definition of a parameter in the command line, and a format of a disabling command line of the command line in a command used to execute configurations. Then, after parsing the static dataset, the parser may capture, from parsed content, the content needed to generate the knowledge corpus.

In an example, the following content is the initial corpus extracted based on the example of the configuration guide in step 301. Content after "//" is a comment of content before "//". The initial language corpus is as follows:

"PageTitle": "bgp", //command name

"FuncDef": "The bgp command enableds bgp and enter the bgp view or displays the BGP view diretly.\n The undo bgp command disables BGP. //command function description

```
"CLIs": [
  "bgp as-number",   //enabling command line
  "undo bgp [as-number]"   //disabling command line
],
"cmd_keys": [
  "undo",
  "bgp"   //keyword of the command line
],
"Parent View": [
  "Command template view",
  "System view"   //working view
],
"ParaDef": [
{
  "Parameters": "as-number",   //type constraint of the parameter
  "Info": "Specifies a destination AS number.\nFor an integral AS number, the value
is an integer ranging from 1 to 4294967295.   //value constraint of the parameter
}
],
"Examples": [
[
    "<ABC> system-view",
    "[~ABC] command group g1",
    "[~ABC-group-g1] bgp 100",
    "[~ABC-group-g1-bgp] peer 1.1.1.1 as-number 100",
    "[~ABC-group-g1-bgp] quit",
    "[~ABC-group-g1] end-group"
],   //configuration instance 1
```

-continued

```
[
    "<ABC> system-view",
    "[~ABC] bgp 100"
], //configuration instance 2
],
"ExtraInfo": "Usage Scenario\n******* //usage guidelines
```

Step 3022: Perform corpus distillation processing based on the initial corpus, to obtain the knowledge corpus.

Performing corpus distillation processing based on the initial corpus is performing processing and extension on the initial corpus. The knowledge corpus is a presentation form of the static dataset. Data presented in the presentation form can be read by the computer device. In this way, the computer device can be used to automatically manage the network device based on the data in the knowledge corpus. In a feasible implementation, the knowledge corpus may be a structured description of the data in the static dataset. The knowledge corpus may include command templates and template relationship information that are obtained through classification based on content of information in the knowledge corpus. In addition, the knowledge corpus optionally further includes a graph model. The following separately provides descriptions thereof.

1. Command Template

A command template is corresponding to a command. The command template is used to describe the command for managing the network device. It can be learned from the foregoing content that, the command template includes one or more of the following: a command name, a command line, a command function description, a configuration instance, a working view of the command line, a definition of a parameter in the command line, and a format of a disabling command line of the command line. The definition of the parameter includes a function definition, a type constraint, and a value constraint of the parameter. In addition, the command name, the command line, the command function description, the configuration instance, the working view of the command line, and the function definition of the parameter are also referred to as basic information of the command template. The type constraint and the value constraint of the parameter in the command line, and the format of the disabling command line are also referred to as segment information of the command template. For definitions of the content of the command template, refer to corresponding descriptions in step 301. Details are not described herein again.

During generation of the command template, the initial corpus may be directly used as content of the command template, or corpus distillation processing may be performed on the initial corpus to obtain content of the command template. In a feasible implementation, when the initial corpus cannot obviously represent content of a command, corpus distillation processing may be performed on the initial corpus. For example, because the initial corpus cannot obviously represent content of the parameter in the command line and the format of the disabling command line, the initial corpus may be processed. In an example of corpus distillation processing, the type constraint of the parameter may be further extracted from the initial corpus of the parameter in the command line, to obtain the type constraint and the value constraint of the parameter. For example, based on the example of the initial corpus in step 3021, the extracted initial corpus "ParaDef" of the parameter in the command line cannot obviously represent the constraints of the parameter. In this case, the type constraint of the parameter may be further extracted from "Parameters" of the initial corpus "ParaDef", to obtain a type "as-number" of the parameter; and the value constraint of the parameter may be further extracted from "Info" of the initial corpus "ParaDef", to learn that a value of the parameter needs to satisfy the following condition: The value of the parameter needs to range from 1 to 4294967295. Optionally, information may be extracted from the initial corpus by using a natural language processing (NLP) method, to obtain the command template.

In addition, the static dataset may carry some prefix information. In an implementation, when the static dataset is provided by a service provider of the network device, the prefix information is related information of the service provider. For example, based on the example in step 3021, the information in "< . . . >" and "[ . . . ]" in the configuration instance "Examples" is the related information of the service provider. These pieces of prefix information are useless for network device management. Therefore, in another implementation of the corpus distillation processing, the prefix information may be deleted from the initial corpus according to a specified rule. The specified rule may be specified based on prefix information that needs to be deleted. Corresponding to the example in step 3021, a configuration instance Examples_parse after the related information of the service provider is deleted is as follows:

```
"Examples_parse": [
  [
    "command group g1",
    " bgp 100",
    " peer 1.1.1.1 as-number 100",
    " !",
    " !"
  ], //configuration instance 1
  [
    "bgp 100"
  ], //configuration instance 2
```

Figure 5:
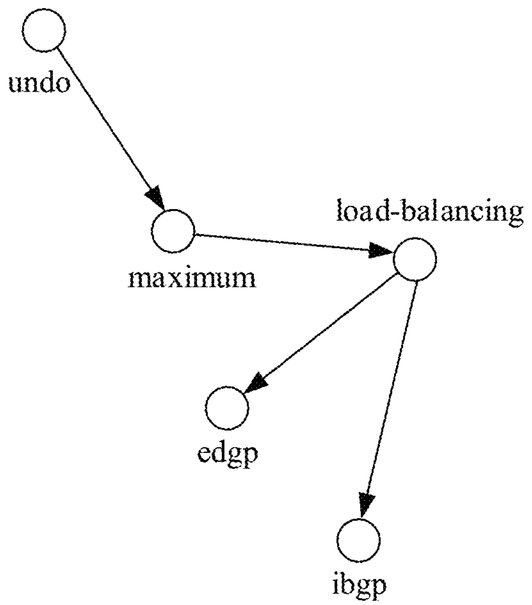
FIG. 5 is a schematic diagram of a disabling command tree according to an embodiment of this application.

In addition, when the initial corpus cannot obviously represent the format of the disabling command line, corpus distillation processing may be performed on the initial corpus. When the format of the disabling command line is obtained based on the initial corpus through the corpus distillation processing, and the format of the disabling command line is used to indicate whether the disabling command line needs to carry a keyword and/or a parameter in a corresponding enabling command line, modeling may be performed on all disabling command lines in the initial corpus to obtain a structured representation of the plurality of disabling command lines in the initial corpus. Then, according to a structured representation sequence, whether fields in enabling command lines appear in the plurality of disabling command lines in the structured representation is determined through query. When a field in an enabling command line appears in a disabling command line in the structured representation, it is determined that the field is disabled, and that the disabling command line needs to carry the field in the corresponding enabling command line. When a field in an enabling command line does not appear in a disabling command line in the structured representation, it is determined that the field is not disabled, and that the disabling command line does not need to carry the field in the corresponding enabling command line. The structured representation of the plurality of disabling command lines may be a disabling command tree represented by a tree structure, nodes of the disabling command tree are obtained through mapping by using fields in the disabling command lines, and a connection relationship between nodes is obtained based on a relationship between fields mapped to corresponding nodes. For example, for the following six enabling command lines:

maximum load-balancing <number> maximum load-balancing ebgp <ebgpNumber> maximum load-balancing ibgp <ibgpNumber> maximum load-balancing <number> ecmp-nexthop-changed maximum load-balancing ebgp <ebgpNumber> ecmp-nexthop-changed maximum load-balancing ibgp <ibgpNumber> ecmp-nexthop-changed corresponding disabling command lines are as follows:

undo maximum load-balancing undo maximum load-balancing ebgp undo maximum load-balancing ibgp A disabling command tree established based on the disabling command lines is shown in FIG. 5. During processing, whether fields in the foregoing six enabling command lines appear in the disabling command tree is determined through query according to a sequence of "undo"→"maximum"→"load-balancing"→"ebgp" in a branch and a sequence of "undo"→"maximum"→"load-balancing"→>"ibgp" in a branch, and whether the corresponding fields are disabled is determined based on a query result. In addition, for the enabling command line maximum load-balancing <number> and the enabling command line maximum load-balancing <number> ecmp-nexthop-changed, the field maximum and the field load-balancing both appear in the disabling command line undo maximum load-balancing. Therefore, it may be determined that the field maximum and the field load-balancing are disabled and that the disabling command line needs to carry the field maximum and the field load-balancing.

For the enabling command line maximum load-balancing ebgp <ebgpNumber> and the enabling command line maximum load-balancing ebgp <ebgpNumber> ecmp-nexthop-changed, the field maximum, the field load-balancing, and the field ebgp all appear in the disabling command line undo maximum load-balancing ebgp. Therefore, it may be determined that the field maximum, the field load-balancing, and the field ebgp are disabled and that the disabling command line needs to carry the field maximum, the field load-balancing, and the field ebgp.

For the enabling command line maximum load-balancing ibgp <ibgpNumber> and the enabling command line maximum load-balancing ibgp <ibgpNumber> ecmp-nexthop-changed, the field maximum, the field load-balancing, and the field ibgp all appear in the disabling command line undo maximum load-balancing ibgp. Therefore, it may be determined that the field maximum, the field load-balancing, and the field ibgp are disabled and that the disabling command line needs to carry the field maximum, the field load-balancing, and the field ibgp.

2. Template Relationship Information

The template relationship information describes relationships between a plurality of command templates. A static dataset usually contains only content of commands and does not explicitly indicate a relationship between commands. Therefore, during generation of the knowledge corpus, the computer device needs to learn the content of the commands to obtain the template relationship information, so that the template relationship information explicitly indicates a relationship between command templates corresponding to the commands. There may be a plurality of relationships between command templates. The following two relationships are used as examples for description in this embodiment of this application.

In a first feasible implementation, the relationships described by the template relationship information include a parent-child relationship between a first command line in a first command template and a second command line in a second command template.

Optionally, a rule satisfied between a parent command line and a child command line is: When a view entered by executing the first command line is a working view of the second command line, the first command line is a parent command line of the second command line. During corpus distillation processing, the computer device may learn the commands in the static dataset according to the rule, to obtain a parent-child relationship between command lines in the command template.

Figure 6:
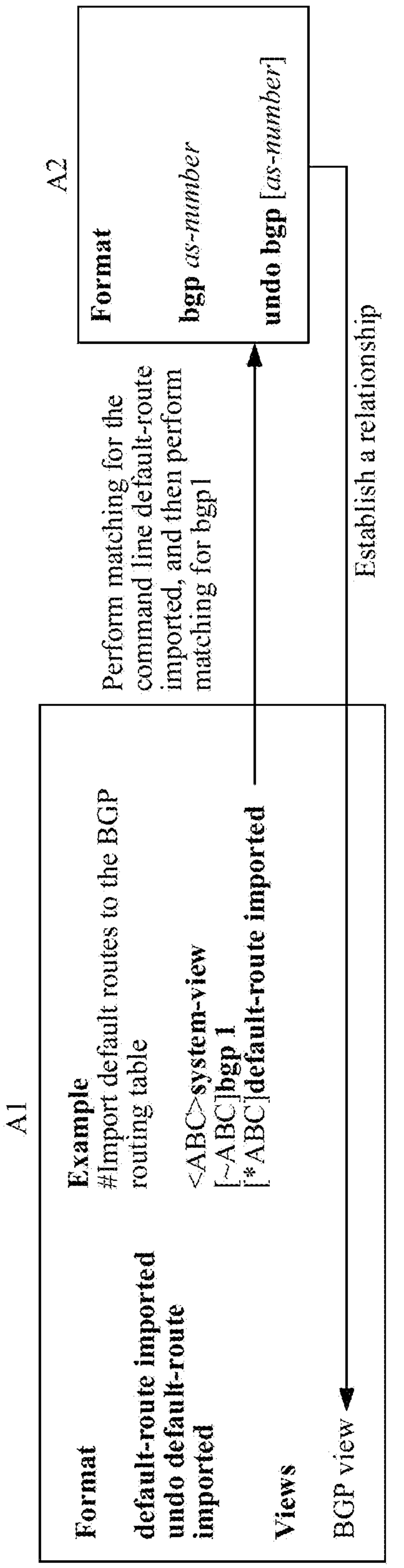
FIG. 6 is a schematic diagram of a principle of determining a parent command line according to an embodiment of this application.

As shown in FIG. 6, content in a box A1 is related information of a command "default-route imported" in the static dataset, and content in a box A2 is related information of the command "bgp" in the static dataset. It can be learned from the configuration instance "Examples" of the command "default-route imported" that, after "bgp 1" is input, a view that may be used for configuring "default-route imported" is entered. In this case, "bgp 1" is a configuration instance of a parent command line of the command line default-route imported. It can be learned from a relationship between a command line and a configuration instance that "bgp 1" is a configuration instance of the command line bgp <as-number>. In addition, it can be learned from the box A1 that a working view of the command line default-route imported is a BGP view, and the BGP view is entered by executing the command line bgp <as-number>. In this case, it may be determined that the command line bgp <as-number> is a parent command line of the command line default-route imported.

It should be noted that, in the static dataset, one command line may have a plurality of working views and configuration instances. In this case, a corresponding parent command line and a corresponding child command line further satisfy the following: When the working view of the second command line is a candidate view that may be entered by a plurality of first command lines during separate execution, a first command line that is in the plurality of first command lines and that may enter candidate views with a smallest total quantity during execution is the parent command line of the second command line. In the plurality of first command lines, the first command line that may enter the candidate views with the smallest total quantity may be considered as having a highest confidence. Therefore, the first command line that may enter the candidate views with the smallest total quantity may be determined as the parent command line of the second command line. The candidate entered view is a view that may be entered. For example, in a scenario, a view 1 is entered when a command line is executed, and in another scenario, a view 2 is entered when the command line is executed. In this case, both the view 1 and the view 2 are candidate views that may be entered by the command line during execution.

Figure 7:
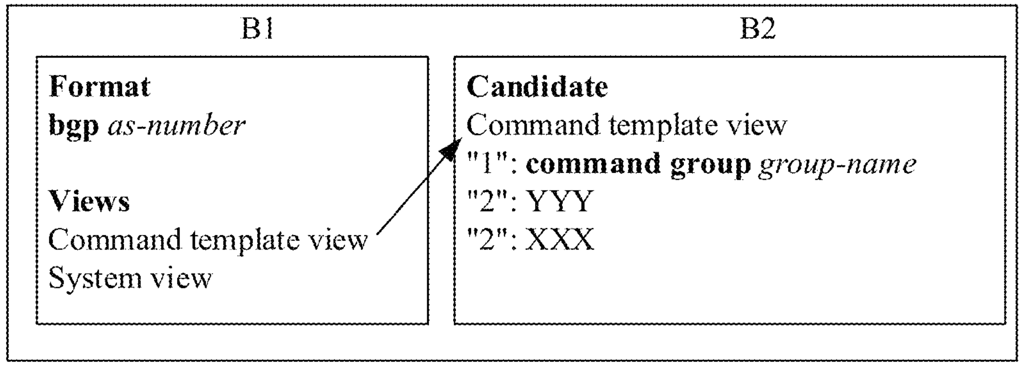
FIG. 7 is a schematic diagram of a principle of determining a parent command line according to an embodiment of this application.

In an example, as shown in a left box B1 in FIG. 7, there are two working views of the command line bgp <as-number>: a view "Command template view" and a view "System view". As shown in a right box B2 in FIG. 7, when a command line command group <group-name>, a command line YYY, and a command line XXX are executed, a candidate view that may be entered by these command lines is the view "Command template view". In addition, "1" before the command line command group <group-name> indicates that a total quantity of candidate views that may be entered by the command line command group <group-name> is 1, "2" before the command line YYY indicates that a total quantity of candidate views that may be entered by the command line YYY is 2, and "2" before the command line XXX indicates that a total quantity of candidate views that may be entered by the command line XXX is 2. Among the three command lines that may enter the candidate view "Command template view", the command line command group <group-name> may enter candidate views with a smallest total quantity. Therefore, it may be determined that the command line command group <group-name> is a command line having a highest confidence among the three command lines, and that the command line command group <group-name> is a parent command line of the command line bgp <as-number>.

Further, according to the rule satisfied between a parent command line and a child command line, because a view entered by executing a parent command line is a working view of a child command line, two command lines having a same parent command line have a same working view. Correspondingly, the relationships described by the template relationship information further include that two command lines having a same parent command line have a same working view.

Optionally, the parent-child relationship between the first command line and the second command line may be represented by using a first tree structure. Optionally, two first nodes in the first tree structure that have a connection relationship represent the first command line and the second command line, and based on a direction of the first tree structure, a command line represented by an anterior first node in the two first nodes is a parent command line and a command line represented by a posterior first node in the two first nodes is a child command line. In a feasible implementation, the first tree structure may be obtained by performing merged modeling on command lines having a parent-child relationship. The parent-child relationship is represented by using the first tree structure, so that the parent-child relationship can be visually presented, and the parent-child relationship is more easily understood.

In a second feasible implementation, the relationships described by the template relationship information may further include an association relationship in which a third command line in a third command template and a fourth command line in a fourth command template have a same field prefix. During corpus distillation processing, command lines in all command templates may be traversed to obtain the association relationship. The knowledge corpus can be read by the computer device and is used to manage the network device, and the computer device usually needs to perform differentiated processing on command lines having different field prefixes. For example, when the computer device generates a yet another next generation (YANG) interface based on the knowledge corpus, for two command lines having different keyword prefixes, the computer device needs to enable different YANG containers to bear data corresponding to the two command lines. Therefore, the relationships described by the template relationship information further include the association relationship, so that the computer device performs differentiated processing on the command lines based on the association relationship.

In addition, a disabling command line disables an enabling command line, and compared with the enabling command line, the disabling command line only disables the enabling command line and has no other functions. Therefore, the association relationship may be obtained based on enabling command lines in the command templates.

Further, the association relationship may be represented by using a second tree structure. Two second nodes in the second tree structure that have a connection relationship represent one field in the third command line and one field in the fourth command line or represent two adjacent fields in the third command line or the fourth command line. In a feasible implementation of corpus distillation, the second tree structure may be obtained by performing merged modeling on command lines having an association relationship. That two fields in a command line are adjacent means that the two fields are sequentially arranged according to a sorting order of fields in the command line. For example, in a command line bgp <as-number> instance <instance-name>, the field bgp and the field <as-number> are adjacent fields, the field <as-number> and the field instance are adjacent fields, and the field instance and the field <instance-name> are adjacent fields. The association relationship is represented by using the second tree structure, so that the association relationship can be visually presented, and the association relationship is more easily understood.

In addition, in the second tree structure, when a tree branch representing the third command line and a tree branch representing the fourth command line have a shared node and non-shared nodes, based on a direction of the second tree structure, all fields represented by the shared node before all the non-shared nodes are same field prefixes of the third command line and the fourth command line. Moreover, a quantity of repeats (repeat) may be further marked on a node, and the quantity of repeats is used to indicate a quantity of times that the node is shared by command lines.

Figure 8:
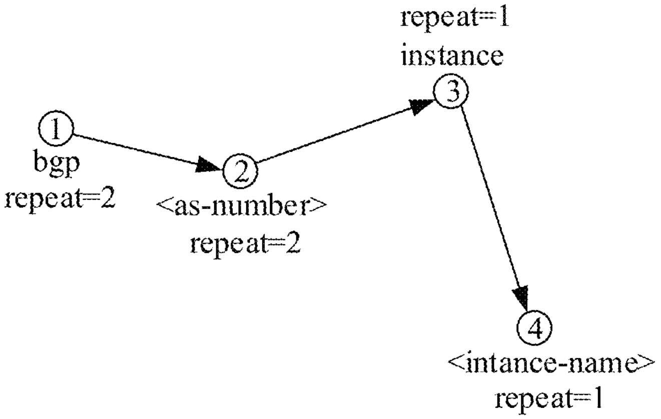
FIG. 8 is a schematic diagram of representing, by using a tree structure, command lines having a same field prefix according to an embodiment of this application.

For example, the command line bgp <as-number> and the command line bgp <as-number> instance <instance-name> have same fields bgp and as-number. When a tree structure shown in FIG. 8 is used to represent the two command lines, each field in the command lines is represented by one node in the tree structure. In addition, based on a direction of the tree structure, a tree branch represented by a node 1 and a node 2 represents the command line bgp <as-number>, and a tree branch represented by the node 1 to a node 4 represents the command line bgp <as-number> instance <instance-name>. It can be learned from FIG. 8 that the node 1 and the node 2 are shared nodes of the two command lines, the node 3 and the node 4 are non-shared nodes of the two command lines, and both the node 1 and the node 2 are located before the non-shared nodes. In this case, the field bgp represented by the node 1 and the field as-number represented by the node 2 are same field prefixes of the two command lines. Moreover, because both the node 1 and the node 2 represent fields in the two command lines, and the node 3 and the node 4 each represent a field in one command line, quantities of repeats of the node 1, the node 2, the node 3, and the node 4 are 2, 2, 1, and 1, respectively. In FIG. 8, circles represent nodes, and numbers in the circles represent sequence numbers of the current nodes.

Figure 9:
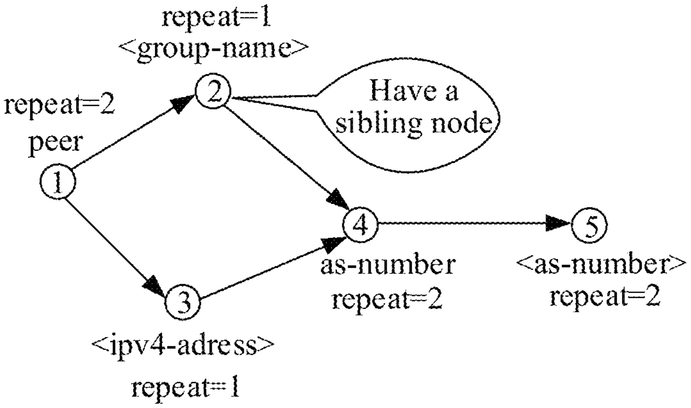
FIG. 9 is another schematic diagram of representing, by using a tree structure, command lines having a same field prefix according to an embodiment of this application.

For another example, when a tree structure shown in FIG. 9 is used to represent a command line peer <ipv4-adress> as-number <as-number> and a command line peer <group-name> as-number <as-number>, each field in the command lines is represented by one node in the tree structure. In addition, based on a direction of the tree structure, a tree branch represented by a node 1, a node 3, a node 4, and a node 5 represents the command line peer <ipv4-adress> as-number <as-number>, and a tree branch represented by the node 1, a node 2, the node 4, and the node 5 represents the command line peer <group-name> as-number <as-number>. It can be learned from FIG. 9 that the node 1, the node 4, and the node 5 are shared nodes of the two command lines, the node 2 and the node 3 are non-shared nodes of the two command lines, and the node 1 is located before both the non-shared nodes. In this case, the field peer represented by the node 1 is a same field prefix of the two command lines. Moreover, because all of the node 1, the node 4, and the node 5 represent fields in the two command lines, and the node 2 and the node 3 each represent a field in one command line, quantities of repeats of the node 1 to the node 5 are 2, 1, 1, 2, and 2, respectively. In FIG. 9, circles represent nodes, and numbers in the circles represent sequence numbers of the current nodes.

Further, a first target node in the second tree structure may further have first label information. The first label information may be obtained by learning the content of the command template during corpus distillation processing. The first label information indicates any one or more of the following: the first target node has a sibling node, and the first target node has a subsequent branch. For two nodes both connected to a same node, the two nodes are sibling nodes of each other. In addition, when a quantity of repeats is marked on a node, the first label information may also be represented by using the quantity of repeats. In a feasible implementation, for any node, if a quantity of repeats of the node is greater than a sum of quantities of repeats of subsequent nodes connected to the node, it indicates that the node has a subsequent branch. For example, in FIG. 8, the quantity of repeats of the node 2 is 2, the node 3 is the only subsequent node connected to the node 2, the quantity of repeats of the node 3 is 1, and the quantity of repeats of the node 2 is greater than the quantity of repeats of the node 3. In this case, it can be learned that the node 2 has a subsequent branch. In FIG. 9, the quantity of repeats of the node 1 is 2, subsequent nodes connected to the node 1 are the node 2 and the node 3, the quantities of repeats of the node 2 and the node 3 are both 1, and the quantity of repeats of the node 1 is not greater than a sum of the quantities of repeats of the node 2 and the node 3. In this case, it can be learned that the node 1 has no subsequent branch.

Optionally, the first label information may always be displayed on the second tree structure. Alternatively, to ensure a visual effect of the second tree structure, first label information of a node may be displayed on the node when the node in the second tree structure is selected, and the first label information of the node may not be displayed when the node is not selected. In addition, the first label information may indicate, in a display manner, whether there is a sibling node and/or whether there is a subsequent branch. Alternatively, the first label information may indicate, in a display manner, which node is a sibling node of a current node, and/or which nodes are included in a subsequent branch of the current node. For example, when the node 2 in FIG. 9 is selected, first label information indicating that the node 2 has a sibling node is displayed, and when the node 3 is not selected, first label information of the node 3 is not displayed.

3. Graph Model

The graph model is used to graphically reflect content of the command template. It can be learned that the graph model is visual presentation of the command template. A graph is an abstract network formed by "vertexes". Vertexes in the network may be connected to each other by using "edges", and such a connection indicates that two "vertexes" have a relationship. The content of the command template is graphically reflected, that is, the content of the command template is represented by the abstract network formed by the "vertexes". It should be noted that the knowledge corpus may be alternatively visually presented in another manner. For example, the command template may be alternatively visually presented by using a table structure of a database. This is not specifically limited in embodiments of this application.

In an implementation, during corpus distillation processing, nodes in the graph model may be obtained through mapping by using fields in a command line in the command template, and a connection relationship between nodes may be obtained based on a relationship between fields mapped to different nodes. Therefore, the following content can be learned: The graph model includes a plurality of nodes that have a connection relationship. The plurality of nodes are obtained through mapping respectively by using a plurality of fields in a command line in the command template reflected by the graph model. A connection relationship between a third node and a fourth node in the graph model is obtained based on a relationship between fields mapped to the third node and the fourth node. In this way, a syntax structure of the command line can be represented by using the graph model, that is, the content of the command template is graphically reflected.

Relationships between fields may include a plurality of types of relationships: a relationship between a keyword and a parameter, a parallel relationship, a multi-choice relationship, and a direction relationship. In a feasible implementation, the parallel relationship may be represented by a character "|" in a command line. The character "|" divides content before and after "|" into parallel branches. Each branch can be mapped to a subgraph of the graph model. A first character in each branch is a head of the branch, and a last character in the branch is a tail of the branch. The multi-choice relationship may be represented by a character "[ ]" and/or a character "{ }" in a command line. Both characters "[ ]" and "{ }" can be mapped to special nodes in the graph model. For example, both "[" and "{" can be mapped to a special node indicating start "start" in the graph model, and both "]" and "}" can be mapped to a special node indicating end "end" in the graph model. In the graph model, the node "start" may be connected to the node "end" through nodes mapped to fields in the characters "[ ]" and "{ }", the node "start" is connected to a node mapped to the head, and a node mapped to the tail is connected to the node "end". Content in the characters "[ ]" and "{ }" is an option. When there are a plurality of options in the characters "[ ]" and "{ }", the character "|" may be used to distinguish between different options. In addition, the character "[ ]" indicates that there is an output or no output in [ ]. The character "{ }" indicates that there is an output in { }. There may be a plurality of output manners for the characters "[ ]" and "{ }". For example, the output manner may include outputting a single option or outputting a plurality of options. When the output manner is outputting a plurality of options, a character "*" after the characters "[ ]" and "{ }" may be used to indicate the output manner. In other words, if the character "*" exists after the characters "[ ]" and "{ }", it indicates that a plurality of options may be output. For example, {a|b|c}* indicates that an output may be one of a, b, c, a b, b a, a c, c a, b c, c b, a b c, a c b, b a c, b c a, c a b, and c b a. [a|bк]* indicates that an output may be empty, or an output may be one of a, b, c, a b, b a, a c, c a, b c, c b, a b c, a c b, b a c, b c a, c a b, and c b a. Moreover, for the multi-choice relationship represented by the character "[ ]", the node "end" in the graph model corresponding to the multi-choice relationship further needs to be connected to the node "start". For the multi-choice relationship represented by the character "{ }", the node "end" in the graph model corresponding to the multi-choice relationship does not need to be connected to the node "start". It can be learned that a direction between the nodes "start" and "end" is a direction relationship between fields in a command line, that is, the direction relationship may be represented by the character "*" in the command line.

Figure 10:
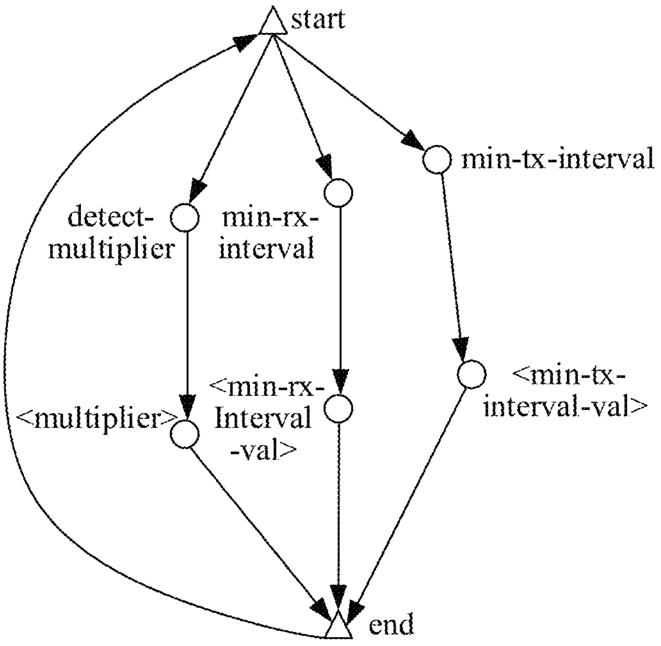
FIG. 10 is a schematic diagram of a graph model according to an embodiment of this application.

A command line {min-tx-interval <min-tx-interval>|min-rx-interval <min-rx-interval>|detect-multiplier <multiplier>}* is used as an example. A graph model of the command line is shown in FIG. 10. It can be learned from FIG. 10 that the command line includes three branches: min-tx-interval <min-tx-interval>, min-rx-interval <min-rx-interval>, and detect-multiplier <multiplier>. Each branch includes two fields, and each of the three branches can be mapped to a subgraph with two nodes. The character "{" in the command line can be mapped to a start node "start" in the graph model, and the character "}" can be mapped to an end node "end" in the graph model. The start node "start" is connected to all nodes mapped to first fields in the three branches, and the end node "end" is connected to all nodes mapped to second fields in the three branches. In addition, because at the end of the command line, the character "*" is carried, it indicates that a plurality of options may be output for the command line, and the node "end" in the graph model of the command line further needs to be connected to the node "start".

Optionally, a second target node in the graph model may further have second label information, and the second label information indicates any one or more of the following: constraints of a parameter mapped to the second target node, and a format of a disabling command line of a command line in which a field mapped to the second target node is located. The constraints of the parameter include a type constraint and/or a value constraint of the parameter. Further, the second label information may further indicate one or more of the following: a command function description, a configuration instance, a working view of a command line, and a function definition of the parameter. Optionally, the second label information may always be displayed in the graph model. Alternatively, to ensure a visual effect of the graph model, second label information of a node may be displayed on the node when the node in the graph model is selected, and the second label information of the node may not be displayed when the node is not selected. The second label information may be obtained by learning the content of the command template during corpus distillation processing.

The graph model is visual presentation of the command template, and the configuration instance is a result obtained by instantiating the parameter in the command line. Therefore, the following correspondence further exists between a graph model and a configuration instance: Fields in the configuration instance are in a one-to-one correspondence with fields mapped to nodes in a specified branch of the graph model. A plurality of fields in the configuration instance are arranged according to a sequence of a plurality of corresponding nodes in the specified branch. A keyword in the configuration instance is the same as a keyword mapped to a corresponding node in the specified branch. A parameter value in the configuration instance satisfies constraints of a parameter mapped to a corresponding node in the specified branch. The fields in the configuration instance include the keyword and/or the parameter value. For example, for the configuration instance bgp 100, the configuration instance includes two fields: a keyword bgp and a parameter value 100. The branch represented by the nodes 1 and 2 in FIG. 8 is a branch of a graph model used to represent the command line bgp <as-number>. The branch includes the node 1 and the node 2, the node 1 is obtained through mapping by using a keyword bgp, the node 2 is obtained through mapping by using a parameter <as-number>, and constraints of the parameter <as-number> are that a numeral type is an integer and a range of the parameter is [1, 4294967295]. It can be learned that the keyword bgp and the parameter value 100 are arranged according to a sequence of the node 1 and the node 2. The keyword bgp in the configuration instance is the same as the keyword bgp mapped to the node 1, and the parameter value 100 in the configuration instance satisfies the constraints of the parameter <as-number> mapped to the node 2.

In some scenarios, whether a given configuration instance matches a given graph model may be determined based on the correspondence between a configuration instance and a graph model. Alternatively, a plurality of existing graph models may be traversed based on a given configuration instance and the correspondence, to determine, from the plurality of graph models, a graph model that matches the configuration instance. Alternatively, with reference to the correspondence between a configuration instance and a graph model, a configuration instance may be generated based on a known graph model, or a graph model may be generated based on a known configuration instance. For example, when the static dataset includes no configuration instance, after a graph model is generated based on the static dataset, a configuration instance may be generated based on the correspondence and the graph model. In a feasible implementation, in a process of generating the configuration instance based on the correspondence and the graph model, a keyword may be output at a node mapped to the keyword, a random value that satisfies constraints of a parameter is output at a node mapped to the parameter, and then the output keyword and random value are spliced according to a sequence of the nodes in the graph model, to obtain the configuration instance corresponding to the graph model. It should be noted that, when the static dataset includes no configuration instance, a configuration instance may be manually entered.

Step 3023: Repair the knowledge corpus.

The knowledge corpus generated by using step 3021 and step 3022 may be directly put into use. Alternatively, the knowledge corpus may be further improved to obtain a more complete knowledge corpus, so that accuracy of the knowledge corpus is improved. In addition, after the knowledge corpus is put into use, the knowledge corpus may be further improved, so that accuracy of the knowledge corpus is improved. In this case, the repair in step 3023 may refer to improvement before the knowledge corpus is put into use, or may refer to improvement after the knowledge corpus is put into use. This is not specifically limited in embodiments of this application. A repair instruction instructs to correct information recorded in a command template in the knowledge corpus, and/or correct a relationship recorded in the template relationship information, and/or correct information represented by a graph model. This is not specifically limited in embodiments of this application either.

An implementation process of step 3023 includes: displaying the knowledge corpus; receiving the repair instruction that instructs to repair the knowledge corpus; and performing a repair operation on the knowledge corpus according to the repair instruction.

Repairing the knowledge corpus includes at least the following three scenarios. The following separately describes implementations of the repair instruction in the three scenarios.

In a first repair scenario, the knowledge corpus may be automatically checked, and when a check result indicates that an error occurs in the knowledge corpus, the knowledge corpus is repaired. The repair scenario may occur before or after the knowledge corpus is put into use. In the repair scenario, the computer device that checks the knowledge corpus may generate an error report, where the error report may indicate a location at which an error occurs in the knowledge corpus. In this case, the repair instruction instructs to repair the error indicated by the error report. In addition, the repair instruction may be automatically generated by the computer device configured to repair the knowledge corpus, or may be sent by a repair person. When the repair instruction is sent by the repair person, the computer device may further display the error report indicating that the error occurs in the knowledge corpus, so that the repair person views the error report.

In an implementation, in a process of checking the knowledge corpus, a specified network element driver may be used to convert a configuration instance in the knowledge corpus into data in a specified format, convert the data in the specified format into a configuration instance, and then determine, based on a conversion result, whether the knowledge corpus is accurate. For example, the conversion process may be converting CLI data into YANG data, and then converting the YANG data into CLI data. When the data in the specified format can be converted into a configuration instance, the configuration instance obtained through conversion may be compared with the original configuration instance. When the configuration instance matches the original configuration instance, it is determined that the knowledge corpus is accurate. When the configuration instance is different from the original configuration instance or the data in the specified format cannot be converted into a configuration instance, it is determined that the knowledge corpus is inaccurate. When the configuration instance is different from the original configuration instance or the data in the specified format cannot be converted into a configuration instance, an error report is usually generated. A user may determine, based on the error report, that the data in the specified format cannot be converted into a configuration instance, and the error report may further indicate a data node on which the conversion cannot be implemented. Optionally, the specified network element driver may be a network element driver generated based on the knowledge corpus, or may be an inventory driver or a manual input driver.

In a second repair scenario, the knowledge corpus may be manually checked, and the knowledge corpus is repaired based on a check result. The repair scenario may occur before or after the knowledge corpus is put into use. A repair person may view the knowledge corpus on the computer device to check accuracy of content in the knowledge corpus, and correct erroneous content when considering that the content is inaccurate. For example, it can be learned from the foregoing content that, when the working view of the second command line is a candidate view that may be entered by a plurality of first command lines during separate execution, the computer device determines, as the parent command line of the second command line, a first command line that is in the plurality of first command lines and that may enter candidate views with a smallest total quantity during execution, and determines other first command lines in the plurality of first command lines as candidate parent command lines of the second command line. In a manual check process, the computer device may display a plurality of candidate parent command lines of the second command line, so that the repair person determines the parent command line of the second command line from the plurality of candidate parent command lines. In addition, to help the repair person view related information of the plurality of candidate parent command lines, the computer device may further display index information used to jump to description information of the candidate parent command lines. Optionally, the index information may be a hyperlink of a page that records a configuration guide of the candidate parent command lines, or may be a hyperlink used to jump to a visual presentation page of a graph model of the candidate parent command lines. When the repair person determines that the parent command line of the second command line needs to be repaired, the repair instruction may be triggered to instruct to modify one of one or more candidate parent command lines to the parent command line of the second command line. Alternatively, when considering that none of the plurality of candidate parent command lines is the parent command line of the second command line, the repair person may further send an instruction of adding a new candidate parent command line for the second command line, to modify the newly added candidate parent command line to the parent command line of the second command line.

Figure 11:
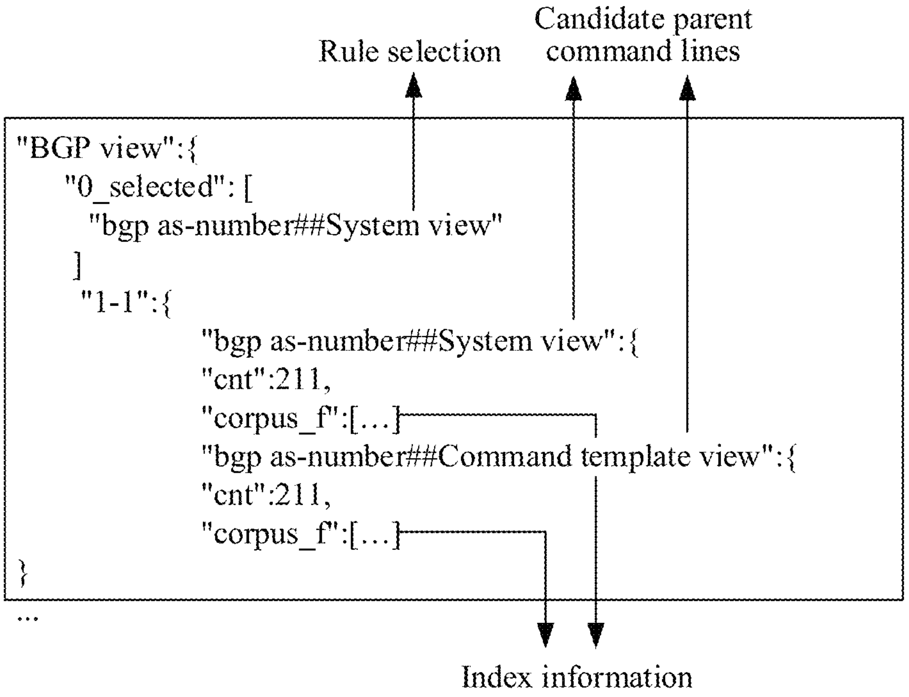
FIG. 11 is a schematic diagram of displaying a plurality of candidate parent command lines of a command line according to an embodiment of this application.

For example, FIG. 11 is a schematic diagram of a plurality of candidate parent command lines of a command line default-route imported whose working view is a BGP view. As shown in FIG. 11, a parent command line determined by the computer device for the command line default-route imported according to a rule is a command line bgp <as-number>, and a working view of the command line bgp <as-number> is "System view". In addition, the computer device further displays the command line bgp <as-number> whose working view is "System view" and a command line bgp <as-number> whose working view is "Command template view", indicates that the two command lines are both candidate parent command lines of the command line default-route imported, and displays index information of the two command lines. In a manual check process, description information of the candidate parent command lines may be viewed by clicking index information, to determine which one of the two command lines is the parent command line of the command line default-route imported.

In a third repair scenario, the knowledge corpus may be repaired based on a usage feedback on the knowledge corpus. The repair scenario may occur after the knowledge corpus is put into use. In a process of using the knowledge corpus, a user may find an error in the knowledge corpus, and sends the usage feedback to a provider of the knowledge corpus when finding the error. The provider of the knowledge corpus can targetedly repair the knowledge corpus based on the usage feedback.

It should be noted that, after the knowledge corpus is checked and/or used, if it is determined that checked and/or used content is correct, a check indicator may be further added to corresponding content, to indicate that verification has been performed on the corresponding content. For example, the command template may further have a first check indicator, and the first check indicator indicates whether the command template has been checked; and/or the template relationship information further has a second check indicator, and the second check indicator indicates whether the template relationship information has been checked. In an implementation, the check indicators may indicate that verification on the corresponding content succeeds. Alternatively, the check indicators may indicate that verification on the corresponding content succeeds or fails.

After the foregoing process is performed, the knowledge corpus can be obtained. Because the data used for generating the knowledge corpus does not need to be obtained through device interaction, feasibility and efficiency of obtaining the data used for generating the knowledge corpus are improved, and feasibility and efficiency of generating the knowledge corpus are correspondingly improved.

Figure 12:
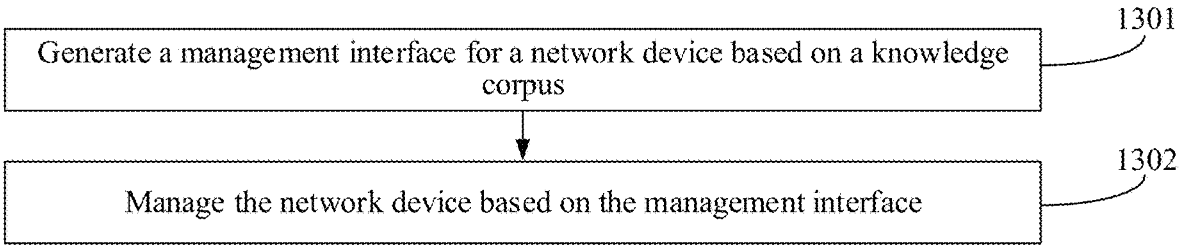
FIG. 12 is a flowchart of managing a network device based on a knowledge corpus according to an embodiment of this application.

The following describes the implementation process of managing the network device based on the knowledge corpus. As shown in FIG. 12, the implementation process may include the following steps.

Step 1301: Generate a management interface for the network device based on the knowledge corpus.

Figure 13:
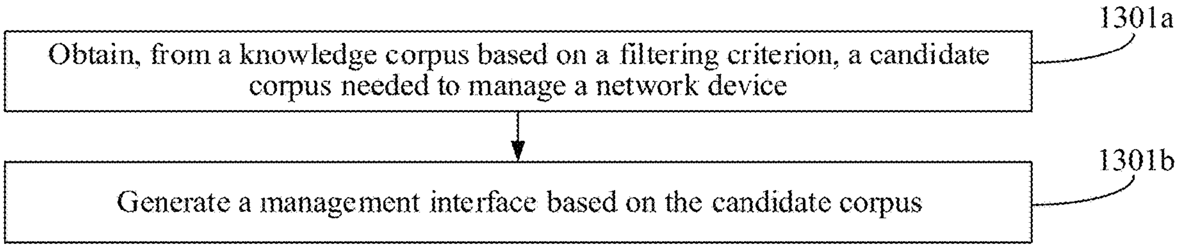
FIG. 13 is a flowchart of generating a management interface for a network device based on a knowledge corpus according to an embodiment of this application.

Optionally, the management interface may be generated based on full content in the knowledge corpus. Alternatively, the management interface is generated based on a part of content in the knowledge corpus. In addition, this part of content may be obtained through filtering. In this case, as shown in FIG. 13, an implementation process of step 1301 may include the following steps.

Step 1301*a*: Obtain, from the knowledge corpus based on a filtering criterion, a candidate corpus needed to manage the network device.

The command template is used to describe a command for managing the network device. Therefore, filtering may be performed in the knowledge corpus based on content that can identify the corresponding command in the command template. In a feasible implementation, the filtering criterion is used to indicate one or more of the following: a command name, a command line, a command function description, a working view, and a configuration instance. Optionally, the filtering criterion may be one or more of the following: a command name, a command line, a command function description, a working view, and a configuration instance. For example, when the filtering criterion is a configuration instance, in a filtering process, a graph model corresponding to the configuration instance may be determined based on the correspondence between a configuration instance and a graph model, and then a command template represented by the graph model is determined. Because the configuration instance is easy to obtain, performing filtering based on the configuration instance can further improve efficiency of managing the network device. The filtering criterion may be a rule indicating one or more of the following: a command name, a command line, a command function description, a working view, and a configuration instance, or the like. For example, the filtering criterion may be a regular expression indicating a command name. For example, a regular expression a*** may indicate all command names starting with a, and related content of all the command names starting with a can be obtained through filtering in the knowledge corpus based on the regular expression.

Step 1301*b*: Generate the management interface based on the candidate corpus.

After obtaining the candidate corpus, the network management device may identify the candidate corpus, and generate the management interface based on the candidate corpus and a mapping conversion relationship between the candidate corpus and the management interface. For example, after obtaining the candidate corpus, the network management device may generate a template file based on the candidate corpus, identify the template file, and convert identified content into the management interface based on a mapping conversion relationship between the template file and the management interface. The template file includes a plurality of subtemplates, and content that needs to be included in each subtemplate is predefined. Therefore, when the template file is generated based on the candidate corpus, corresponding content may be extracted from the candidate corpus based on the content that needs to be included in each subtemplate, and the extracted content may be filled in the subtemplate. In addition, when the template file is identified, the information filled in the subtemplate may be identified based on the content that needs to be included in the subtemplate. Optionally, the management interface may include a YANG interface, a command line interface, a simple network management protocol (SNMP) interface, or a hypertext transfer protocol (HTTP) interface. The management interface is generated based on the candidate corpus, so that a volume of data that needs to be processed for generating the management interface can be reduced, and efficiency of managing the network device can be improved.

Step 1302: Manage the network device based on the management interface.

Managing the network device based on the management interface may include any one or more of the following: performing configuration for the network device based on the management interface, querying for the configuration of the network device based on the management interface, and testing the management interface.

Figure 14:
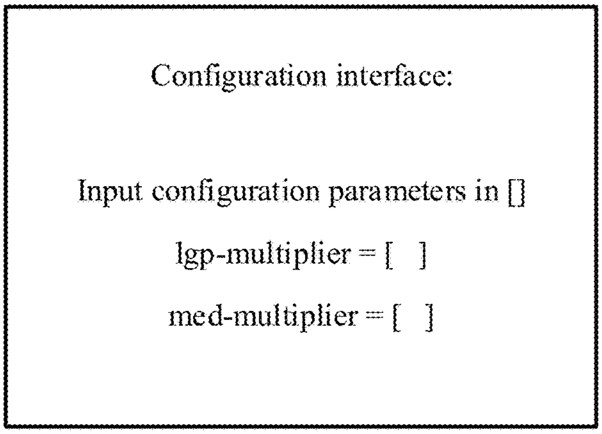
FIG. 14 is a schematic diagram of configuring parameter values for parameters in a command line according to an embodiment of this application.

In a process of performing configuration for the network device based on the management interface, for any command line that needs to be executed for configuration execution, if a user needs to configure a parameter value of a parameter in the command line, a configuration interface is output, so that the user inputs the parameter value, and delivers the configuration to the network device based on the input parameter value. For example, during configuration of a function of the network device, command lines lgp-multiplier <lgp-multiplier> and med-multiplier <med-multiplier> need to be executed, and then a configuration interface shown in FIG. 14 is displayed. After the user inputs a parameter value 10 of <lgp-multiplier> and a parameter value 100 of <med-multiplier> on the configuration interface, the function of the network device may be configured based on the input parameters. Optionally, parameter constraints of the parameter in the command line may be further displayed on the configuration interface, to provide a reference for the user to input the parameter. Configuration is performed for the network device based on the management interface, so that a network controller can manage the network device, and a configuration period of the network device can be effectively shortened.

In a process of querying for the configuration of the network device based on the management interface, after the network management device receives a query command, the network management device may query, based on a function indicated by the query command, the knowledge corpus for a command line matching the function, and query configuration information of the network device for a parameter value of a parameter in the command line based on a syntax of the command line.

In a process of testing the management interface, the management interface may be used to convert known network element data into data in a specified format, convert the data in the specified format into network element data, and then determine, based on a conversion result, whether the management interface is normal. For example, the conversion process may be converting CLI data into YANG data, and then converting the YANG data into CLI data. When the data in the specified format can be converted into network element data, the network element data obtained through conversion may be compared with the known network element data. When the two pieces of network element data are the same, it is determined that the management interface is normal. When the two pieces of network element data are different or the data in the specified format cannot be converted into network element data, it is determined that the management interface is abnormal. When the two pieces of network element data are different or the data in the specified format cannot be converted into network element data, an error report is usually generated. The user may determine, based on the error report, that the data in the specified format cannot be converted into network element data, and the error report may further indicate a data node on which the conversion cannot be implemented.

In summary, in the method for managing a network device provided in embodiments of this application, because the data used for generating the knowledge corpus does not need to be obtained through device interaction, feasibility and efficiency of obtaining the data used for generating the knowledge corpus are improved, and feasibility and efficiency of generating the knowledge corpus are correspondingly improved. Managing the network device based on the knowledge corpus is conducive to improving efficiency of managing the network device.

It should be noted that, a sequence of the steps of the method for managing a network device provided in embodiments of this application may be adjusted appropriately, or a step may be correspondingly added or deleted depending on a situation. Any method variation readily figured out by a person skilled in the art within the technical scope disclosed in this application shall fall within the protection scope of this application. Therefore, details are not described.

Figure 15:
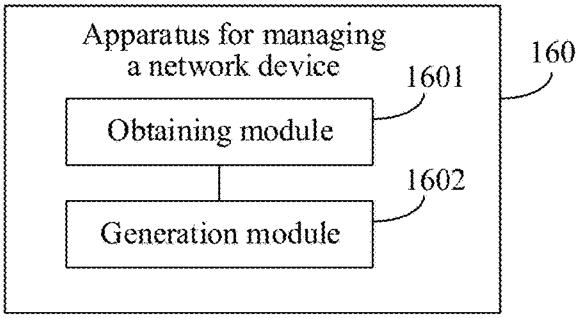
FIG. 15 is a schematic diagram of a structure of an apparatus for managing a network device according to an embodiment of this application.

An embodiment of this application further provides an apparatus for managing a network device. As shown in FIG. 15, the apparatus 160 for managing a network device includes:

an obtaining module 1601, configured to obtain a static dataset, where the static dataset is used to indicate how to manage a network device, and the static dataset includes data that is generated independent of a device interaction process; for an operation performed by the obtaining module 1601, refer to related descriptions of step 301 in the embodiment shown in FIG. 3; and a generation module 1602, configured to generate a knowledge corpus based on the static dataset, where the knowledge corpus is used to manage the network device; for an operation performed by the generation module 1602, refer to related descriptions of step 302 in the embodiment shown in FIG. 3.

Optionally, the static dataset includes any one or more of the following: a configuration guide, a technical guide, a technical white paper, a design document, and command modeling data of the network device.

Optionally, the knowledge corpus includes command templates and template relationship information, the command template is used to describe a command for managing the network device, and the template relationship information describes relationships between a plurality of command templates.

Optionally, the command template includes one or more of the following: a command name, a command line, a command function description, a configuration instance, a working view of the command line, a definition of a parameter in the command line, and a format of a disabling command line of the command line.

Optionally, the definition of the parameter includes a function definition, a type constraint, and a value constraint of the parameter.

Optionally, the command template has a first check indicator, and the first check indicator indicates whether the command template has been checked.

Optionally, the relationships described by the template relationship information include a parent-child relationship between a first command line in a first command template and a second command line in a second command template.

Optionally, the relationships described by the template relationship information further include that two command lines having a same parent command line have a same working view.

Optionally, the parent-child relationship is represented by using a first tree structure, two first nodes in the first tree structure that have a connection relationship represent the first command line and the second command line, and based on a direction of the first tree structure, a command line represented by an anterior first node in the two first nodes is a parent command line and a command line represented by a posterior first node in the two first nodes is a child command line.

Optionally, the relationships described by the template relationship information further include an association relationship in which a third command line in a third command template and a fourth command line in a fourth command template have a same field prefix.

Optionally, the association relationship is represented by using a second tree structure, two second nodes in the second tree structure that have a connection relationship represent one field in the third command line and one field in the fourth command line or represent two adjacent fields in the third command line or the fourth command line, and the field includes a keyword and/or a parameter. When a tree branch representing the third command line and a tree branch representing the fourth command line have a shared node and non-shared nodes, based on a direction of the second tree structure, a field represented by a shared node before all the non-shared nodes is the same field prefix of the third command line and the fourth command line.

Optionally, a first target node in the second tree structure further has first label information, and the first label information indicates any one or more of the following: the first target node has a sibling node, and the first target node has a subsequent branch.

Optionally, the template relationship information has a second check indicator, and the second check indicator indicates whether the template relationship information has been checked.

Optionally, the knowledge corpus further includes a graph model, and the graph model is used to graphically reflect content of the command template.

Optionally, the graph model includes a plurality of nodes that have a connection relationship. The plurality of nodes are obtained through mapping respectively by using a plurality of fields in a command line in the command template reflected by the graph model. A connection relationship between a third node and a fourth node in the graph model is obtained based on a relationship between fields mapped to the third node and the fourth node. The field includes a keyword and/or a parameter.

Optionally, a second target node in the graph model further has second label information, and the second label information indicates any one or more of the following: constraints of a parameter mapped to the second target node, and a format of a disabling command line of a command line in which a field mapped to the second target node is located.

Optionally, the command template includes the configuration instance. Fields in a configuration instance are in a one-to-one correspondence with fields mapped to nodes in a specified branch of a graph model. A plurality of fields in the configuration instance are arranged according to a sequence of a plurality of corresponding nodes in the specified branch. The fields in the configuration instance include a keyword and/or a parameter value, and the fields in the graph model include a keyword and/or a parameter. The keyword in the configuration instance is the same as the keyword mapped to a corresponding node in the specified branch. The parameter value in the configuration instance satisfies constraints of the parameter mapped to a corresponding node in the specified branch.

Optionally, the generation module 1602 is specifically configured to: extract an initial corpus from the static dataset; and perform corpus distillation processing based on the initial corpus, to obtain the knowledge corpus.

Optionally, the generation module 1602 is further specifically configured to repair the knowledge corpus.

Optionally, the generation module 1602 is further specifically configured to: display the knowledge corpus; receive a repair instruction that instructs to repair the knowledge corpus; and perform a repair operation on the knowledge corpus according to the repair instruction.

Optionally, the generation module 1602 is further specifically configured to display an error report indicating that an error occurs in the knowledge corpus. In this case, the repair instruction instructs to repair the error indicated by the error report.

Optionally, the repair instruction instructs to correct information recorded in a command template in the knowledge corpus, or a relationship recorded in the template relationship information.

Figure 16:
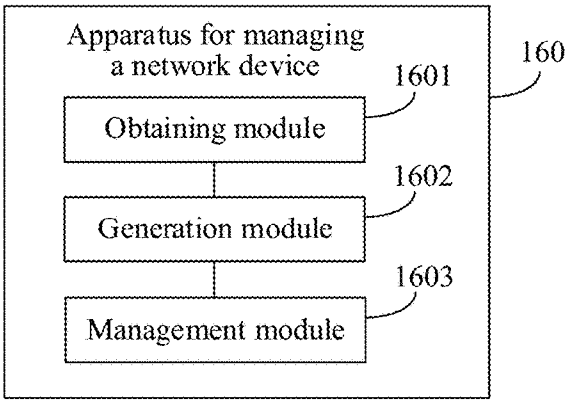
FIG. 16 is a schematic diagram of a structure of another apparatus for managing a network device according to an embodiment of this application.

Optionally, as shown in FIG. 16, the apparatus for managing a network device further includes a management module 1603, configured to manage the network device based on the knowledge corpus. For an operation performed by the management module 1603, refer to related descriptions in the embodiment shown in FIG. 12.

Optionally, the management module 1603 is specifically configured to: generate a management interface for the network device based on the knowledge corpus; and manage the network device based on the management interface.

Optionally, the management interface includes a yet another next generation YANG interface, a command line interface CLI, a simple network management protocol SNMP interface, or a hypertext transfer protocol HTTP interface.

Optionally, the management module 1603 is specifically configured to: obtain, from the knowledge corpus based on a filtering criterion, a candidate corpus needed to manage the network device, where the filtering criterion is used to indicate one or more of the following: a command name, a command line, a command function description, a working view, and a configuration instance; and generate the management interface based on the candidate corpus.

In summary, in the apparatus for managing a network device provided in this embodiment of this application, because the data used for generating the knowledge corpus does not need to be obtained through device interaction, feasibility and efficiency of obtaining the data used for generating the knowledge corpus are improved, and feasibility and efficiency of generating the knowledge corpus are correspondingly improved. Managing the network device based on the knowledge corpus is conducive to improving efficiency of managing the network device.

It can be clearly understood by a person skilled in the art that, for the purpose of convenient and brief description, for detailed working processes of the foregoing apparatuses and modules, refer to corresponding content in the foregoing method embodiment. Details are not described herein again.

An embodiment of this application provides a network management device. The network management device includes a memory and a processor. The memory stores program instructions, and the processor runs the program instructions to perform the method for managing a network device provided in this application or perform any step of the method for managing a network device provided in this application. For example, the network management device performs the following process: obtaining a static dataset, where the static dataset is used to indicate how to manage a network device, and the static dataset includes data that is generated independent of a device interaction process; and generating a knowledge corpus based on the static dataset, where the knowledge corpus is used to manage the network device. In addition, for an implementation process in which the network management device executes the program instructions in the memory to perform the steps of the method for managing a network device provided in this application, refer to corresponding descriptions in the foregoing method embodiment. Optionally, the network management device may be a network device like a network controller. Alternatively, the network management device may be implemented by using a computer device, the computer device may be implemented by using one or more of the following: a terminal, a physical machine, a cloud server, or a bare metal server. This is not specifically limited in embodiments of this application.

Figure 17:
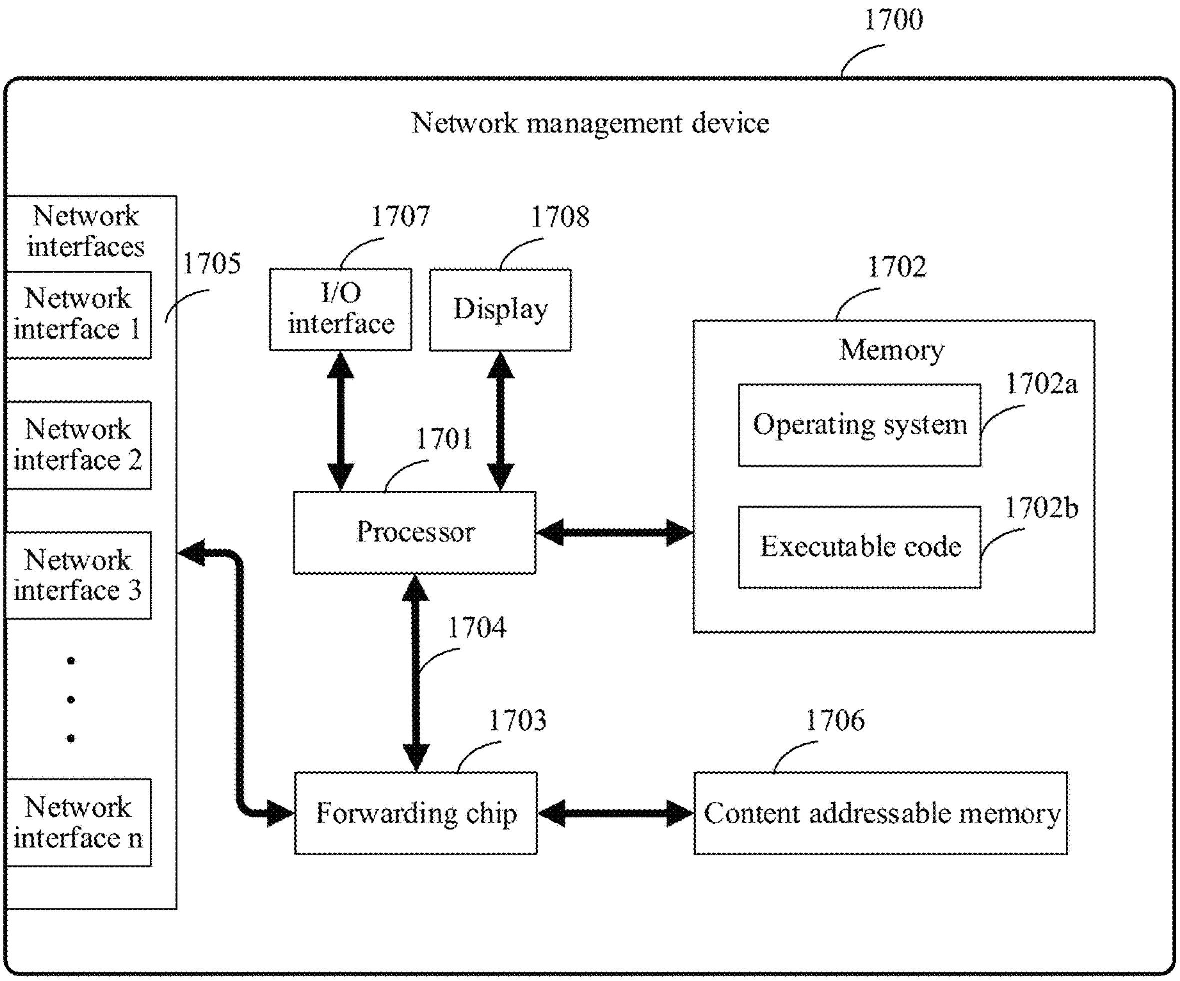
FIG. 17 is a schematic diagram of a structure of an apparatus for managing a network device according to an embodiment of this application.

FIG. 17 is a schematic diagram of a hardware structure of a network management device according to an embodiment of this application. As shown in FIG. 17, the network management device 1700 includes a processor 1701, a memory 1702, a forwarding chip 1703, an internal connection 1704, and at least one network interface 1705. The processor 1701 and the memory 1702, the processor 1701 and the forwarding chip 1703, and the forwarding chip 1703 and the network interface 1705 are connected through the internal connection 1704.

The processor 1701 may include a general-purpose processor and/or a dedicated hardware chip. The general-purpose processor may include a central processing unit (CPU), a microprocessor, or a graphics processing unit (GPU). For example, a CPU is a single-core processor (single-CPU), or a multi-core processor (multi-CPU). The dedicated hardware chip is a hardware module capable of performing high-performance processing. The dedicated hardware chip includes at least one of an application-specific integrated circuit (ASIC), a field-programmable gate array (FPGA), or a network processor (NP). The processor 1701 may be alternatively an integrated circuit chip and has a signal processing capability. In an implementation process, some or all functions of the method for managing a network device in this application may be implemented by using an integrated logic circuit of hardware in the processor 1701 or instructions in a form of software.

The memory 1702 is configured to store a computer program, and the computer program includes an operating system 1702*a* and executable code 1702*b*. For example, the memory 1702 is a read-only memory (ROM), another type of static storage device that can store static information and instructions, a random access memory (RAM), another type of dynamic storage device that can store information and instructions, an electrically erasable programmable read-only memory (EEPROM), a compact disc read-only memory (CD-ROM), other optical disk storage, optical disc storage (including a compact disc, a laser disc, an optical disc, a digital versatile disc, a Blu-ray disc, or the like), a magnetic disk storage medium, another magnetic storage device, or any other medium that can be used to carry or store expected executable code in a form of instructions or a data structure and that can be accessed by a computer. However, no limitation is imposed thereto. For example, the memory 1702 is configured to store an egress port queue and the like. The memory 1702 exists independently or the like, and is connected to the processor 1701 through the internal connection 1704. Alternatively, the memory 1702 and the processor 1701 are integrated together. The memory 1702 may store the executable code. When the executable code stored in the memory 1702 is executed by the processor 1701, the processor 1701 is configured to perform the method for managing a network device provided in embodiments of this application. The memory 1702 may further include another software module, data, and the like that are needed for process running.

The forwarding chip 1703 is configured to forward data. For example, the forwarding chip 1703 is configured to forward a data packet sent by a transmit end device to a receive end device.

The internal connection 1704 includes a path for transmitting data between the network interface 1705, the forwarding chip 1703, and the processor 1701. Optionally, the internal connection 1704 is a board or a bus. For example, the internal connection 1704 is an Ethernet, a fiber channel, a PCI-E (peripheral component interconnect express, PCI Express, which is a high-speed serial computer bus), RapidIO (a high-performance packet-switched interconnection architecture with a small quantity of pins), InfiniBand, or a XAUI bus (an interface extender, characterized by connecting an Ethernet media access control (MAC) layer to a physical layer).

The at least one network interface 1705 includes, for example, a network interface 1, a network interface 2, a network interface 3, . . . , and a network interface n in FIG. 17. The network interface 1705 uses any transceiver-like apparatus configured to communicate with another device or a communication network. Optionally, the network interface 1705 includes at least one of a wired network interface or a wireless network interface. The wired network interface is, for example, an Ethernet interface. The Ethernet interface is, for example, an optical interface, an electrical interface, or a combination thereof. The wireless network interface is, for example, a wireless protected network (WLAN) interface, a cellular network interface, or a combination thereof.

Optionally, as shown in FIG. 17, the network management device 1700 further includes a content addressable memory (CAM) 1706. The CAM 1706 is, for example, a ternary content addressable memory (TCAM). Optionally, the CAM 1706 exists independently, and is connected to the forwarding chip 1703 through the internal connection 1704. Alternatively, the CAM 1706 and the forwarding chip 1703 are integrated together, that is, the CAM 1706 is used as a memory inside the forwarding chip 1703.

Optionally, as shown in FIG. 17, the network management device 1700 further includes an input/output (I/O) interface 1707. The I/O interface 1707 is connected to the processor 1701 and the memory 1702 through the internal connection 1704. The processor 1701 can receive an input command, data, or the like through the I/O interface 1707. The I/O interface 1707 is configured to connect the network management device 1700 to input devices. These input devices are, for example, a keyboard and a mouse. Optionally, in some possible scenarios, the network interface 1705 and the I/O interface 1707 are collectively referred to as communication interfaces.

Optionally, as shown in FIG. 17, the network management device 1700 further includes a display 1708. The display 1708 is connected to the processor 1701 and the memory 1702 through the internal connection 1704. The display 1708 can be configured to display information such as a graph model. In a possible implementation, the display 1708 is a touchscreen, to provide a man-machine interaction interface.

Optionally, the foregoing components are separately disposed on chips independent of each other, or at least some or all of the components are disposed on a same chip. Whether the components are independently disposed on different chips or are disposed on one or more chips in an integrated manner usually depends on requirements of a product design. Specific implementation forms of the foregoing components are not limited in this embodiment of this application.

An embodiment of this application provides a computer device. The computer device includes a memory and a processor. The memory stores program instructions, and the processor runs the program instructions to perform the method for managing a network device provided in this application or perform any step of the method for managing a network device provided in this application. For example, the computer device performs the following process: obtaining a static dataset, where the static dataset is used to indicate how to manage a network device, and the static dataset includes data that is generated independent of a device interaction process; and generating a knowledge corpus based on the static dataset, where the knowledge corpus is used to manage the network device. In addition, for an implementation process in which the computer device executes the program instructions in the memory to perform the steps of the method for managing a network device provided in this application, refer to corresponding descriptions in the foregoing method embodiment.

Figure 18:
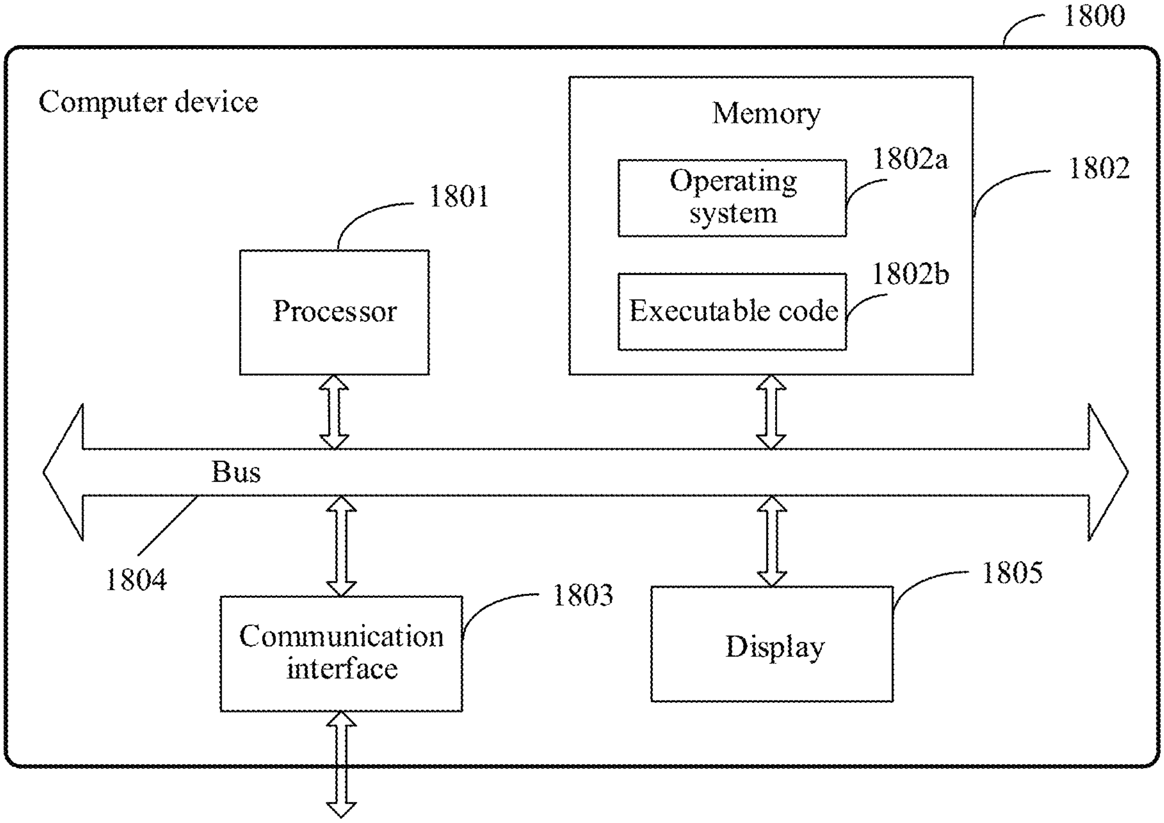
FIG. 18 is a schematic diagram of a structure of a computer device according to an embodiment of this application.

FIG. 18 is a schematic diagram of a structure of a computer device according to an embodiment of this application. As shown in FIG. 18, the computer device 1800 includes a processor 1801, a memory 1802, a communication interface 1803, and a bus 1804. The memory 1802, the processor 1801, and the communication interface 1803 implement mutual communication connections through the bus 1804. In addition, the computer device 1800 may include a plurality of processors 1801, so that functions of the foregoing different functional modules are implemented by using different processors.

The processor 1801 may include a general-purpose processor and/or a dedicated hardware chip. The general-purpose processor may include a central processing unit, a microprocessor, or a graphics processing unit. For example, a CPU is a single-core processor, or a multi-core processor. The dedicated hardware chip is a hardware module capable of performing high-performance processing. The dedicated hardware chip includes at least one of an application-specific integrated circuit, a field-programmable gate array, or a network processor. The processor 1801 may be alternatively an integrated circuit chip and has a signal processing capability. In an implementation process, some or all functions of the method for managing a network device in this application may be implemented by using an integrated logic circuit of hardware in the processor 1801 or instructions in a form of software.

The memory 1802 is configured to store a computer program, and the computer program includes an operating system 1802*a* and executable code 1802*b*. For example, the memory 1802 is a read-only memory, another type of static storage device that can store static information and instructions, a random access memory, another type of dynamic storage device that can store information and instructions, an electrically erasable programmable read-only memory, a compact disc read-only memory, other optical disk storage, optical disc storage (including a compact disc, a laser disc, an optical disc, a digital versatile disc, a Blu-ray disc, or the like), a magnetic disk storage medium, another magnetic storage device, or any other medium that can be used to carry or store expected executable code in a form of instructions or a data structure and that can be accessed by a computer. However, no limitation is imposed thereto. For example, the memory 1802 is configured to store an egress port queue and the like. The memory 1802 exists independently or the like, and is connected to the processor 1801 through the internal connection 1804. Alternatively, the memory 1802 and the processor 1801 are integrated together. The memory 1802 may store the executable code. When the executable code stored in the memory 1802 is executed by the processor 1801, the processor 1801 is configured to perform the method for managing a network device provided in embodiments of this application. The memory 1802 may further include another software module, data, and the like that are needed for process running, for example, an operating system.

The communication interface 1803 uses, by way of example rather than limitation, a transceiver module like a transceiver, to implement communication between the computer device 1800 and another device or a communication network. The communication interface 1803 may be any one or any combination of the following components with network access functions: a network interface (for example, an Ethernet interface) and a wireless network interface card.

The bus 1804 is a communication bus of any type, and is configured to implement interconnections between internal components (for example, the memory 1802, the processor 1801, and the communication interface 1803) of the computer device 1800. For example, the bus 1804 is a system bus. In this embodiment of this application, an example in which the foregoing internal components of the computer device 1800 are interconnected through the bus 1804 is used for description. Optionally, communication connections between the foregoing internal components of the computer device 1800 are implemented in another connection mode other than the bus 1804. For example, the foregoing internal components of the computer device 1800 are interconnected through a logical interface inside the computer device 1800.

Optionally, the computer device 1800 further includes a display 1805, and the display 1805 is connected to the processor 1801 and the memory 1802 through the bus 1804. The display 1805 can be configured to display a graph model and the like. In a possible implementation, the display 1805 is a touchscreen, to provide a man-machine interaction interface.

The foregoing components may be separately disposed on chips independent of each other, or at least some or all of the components may be disposed on a same chip. Whether the components are independently disposed on different chips or are disposed on one or more chips in an integrated manner usually depends on requirements of a product design. Specific implementation forms of the foregoing components are not limited in this embodiment of this application. Descriptions of procedures corresponding to the foregoing accompanying drawings have respective focuses. For a part that is not described in detail in a procedure, refer to related descriptions of other procedures.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product that provides a program development platform includes one or more computer instructions. When these computer program instructions are loaded and executed on the computer device, all or some of the procedures or functions of the method for managing a network device provided in embodiments of this application are implemented.

The computer device may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium stores the computer program instructions that provide the program development platform.

This application provides a network system. The network system includes a network management device and a network device. The network device is configured to provide a network service. The network management device is configured to manage the network device by using the method for managing a network device provided in this application. For implementations of the network management device and the network device, refer to FIG. 1 and related content of FIG. 1. In addition, the network management device may implement the methods in steps 301 and 302 and steps 1301 and 1302 in the foregoing embodiments.

This application provides a network system. The network system includes a corpus generation device, a network management device, and a network device. The corpus generation device is configured to generate a knowledge corpus by using the method for managing a network device provided in this application. The network device is configured to provide a network service. The network management device is configured to manage the network device based on the knowledge corpus by using the method for managing a network device provided in this application. For implementations of the corpus generation device, the network management device, and the network device, refer to FIG. 2 and related content of FIG. 2. The corpus generation device is the computer device 03 in FIG. 2. In addition, the corpus generation device may implement the method in step 301 and step 302 in the foregoing embodiment. The network management device may implement the method in step 1301 and step 1302 in the foregoing embodiment.

An embodiment of this application further provides a computer-readable storage medium. The computer-readable storage medium is a non-volatile computer-readable storage medium, and the computer-readable storage medium includes program instructions. When the program instructions are run on a computer device, the computer device is enabled to perform the method for managing a network device provided in embodiments of this application.

An embodiment of this application further provides a computer program product including instructions. When the computer program product runs on a computer, the computer is enabled to perform the method for managing a network device provided in embodiments of this application.

A person of ordinary skill in the art can understand that all or some of the steps for implementing the foregoing embodiments may be implemented by hardware or a program instructing related hardware. The program may be stored in a computer-readable storage medium. The storage medium may be a read-only memory, a magnetic disk, an optical disc, or the like.

In embodiments of this application, terms "first", "second", and "third" are merely used for description, but cannot be understood as an indication or an implication of relative importance. A term "at least one" means one or more, and a term "a plurality of" means two or more, unless otherwise expressly limited.

A term "and/or" in this application describes only an association relationship for describing associated objects and represents that three relationships may exist. For example, A and/or B may represent the following three cases: Only A exists, both A and B exist, and only B exists. In addition, a character "/" in this specification generally indicates an "or" relationship between associated objects.

It should be noted that information (including but not limited to user equipment information and personal information of a user), data (including but not limited to data used for analysis, stored data, and presented data), and signals in this application are all used under authorization by the user or full authorization by all parties, and collection, use, and processing of related data need to conform to related laws, regulations, and standards of related countries and regions. For example, the static data in this application is obtained under full authorization.

The foregoing descriptions are only optional embodiments of this application, but are not intended to limit this application. Any modification, equivalent replacement, improvement, or the like made without departing from the concept and principle of this application shall fall within the protection scope of this application.

The invention claimed is:

1. A method for managing a network device, wherein the method comprises:

obtaining a static dataset, wherein the static dataset indicates how to manage a network device, and the static dataset comprises data that is generated independent of a device interaction process;

generating a knowledge corpus based on the static dataset, wherein the knowledge corpus comprises information for managing the network device, wherein the knowledge corpus comprises template relationship information, the template relationship information describes relationships between a plurality of command templates, and the relationships described by the template relationship information comprises that two command lines having a same parent command line have a same working view, and wherein the relationships described by the template relationship information comprise a parent-child relationship between a first command line in a first command template and a second command line in a second command template, the parent-child relationship is represented by using a first tree structure, two first nodes in the first tree structure that have a connection relationship represent the first command line and the second command line, and based on a direction of the first tree structure, a command line represented by an anterior first node in the two first nodes is a parent command line, and a command line represented by a posterior first node in the two first nodes is a child command line;

generating a machine-readable management interface for the network device based on the knowledge corpus; and managing the network device based on the machine-readable management interface.

2. The method according to claim 1, wherein the static dataset comprises one or more of the following: a configuration guide, a technical guide, a technical white paper, a design document, or command modeling data of the network device.

3. The method according to claim 1, wherein the knowledge corpus further comprises command templates, and a command template describes a command for managing the network device.

4. The method according to claim 3, wherein the command template comprises one or more of the following: a command name, a command line, a command function description, a configuration instance, a working view of the command line, a definition of a parameter in the command line, or a format of a disabling command line of the command line.

5. The method according to claim 4, wherein the definition of the parameter comprises a function definition, a type constraint, and a value constraint of the parameter.

6. The method according to claim 3, wherein the command template has a first check indicator, and the first check indicator indicates whether the command template has been checked.

7. The method according to claim 1, wherein the relationships described by the template relationship information further comprise an association relationship in which a third command line in a third command template and a fourth command line in a fourth command template have a same field prefix.

8. An apparatus for managing a network device, wherein the apparatus comprises:

at least one processor; and one or more memories coupled to the at least one processor and storing programming instructions for execution by the at least one processor to:

obtain a static dataset, wherein the static dataset indicates how to manage a network device, and the static dataset comprises data that is generated independent of a device interaction process;

generate a knowledge corpus based on the static dataset, wherein the knowledge corpus comprises information for managing the network device, wherein the knowledge corpus comprises template relationship information, the template relationship information describes relationships between a plurality of command templates, and the relationships described by the template relationship information comprises that two command lines having a same parent command line have a same working view, and wherein the relationships described by the template relationship information comprise a parent-child relationship between a first command line in a first command template and a second command line in a second command template, the parent-child relationship is represented by using a first tree structure, two first nodes in the first tree structure that have a connection relationship represent the first command line and the second command line, and based on a direction of the first tree structure, a command line represented by an anterior first node in the two first nodes is a parent command line, and a command line represented by a posterior first node in the two first nodes is a child command line;

generate a machine-readable management interface for the network device based on the knowledge corpus; and manage the network device based on the machine-readable management interface.

9. The apparatus according to claim 8, wherein the static dataset comprises one or more of the following: a configuration guide, a technical guide, a technical white paper, a design document, or command modeling data of the network device.

10. The apparatus according to claim 8, wherein the knowledge corpus further comprises command templates, and a command template describes a command for managing the network device.

11. The apparatus according to claim 10, wherein the command template comprises one or more of the following: a command name, a command line, a command function description, a configuration instance, a working view of the command line, a definition of a parameter in the command line, or a format of a disabling command line of the command line.

12. The apparatus according to claim 11, wherein the definition of the parameter comprises a function definition, a type constraint, and a value constraint of the parameter.

13. The apparatus according to claim 10, wherein the command template has a first check indicator, and the first check indicator indicates whether the command template has been checked.

14. A non-transitory computer-readable storage medium, wherein the non-transitory computer-readable storage medium stores programming instructions for execution by at least one processor to:

obtain a static dataset, wherein the static dataset indicates how to manage a network device, and the static dataset comprises data that is generated independent of a device interaction process;

generate a knowledge corpus based on the static dataset, wherein the knowledge corpus comprises information for managing the network device, wherein the knowledge corpus comprises template relationship information, the template relationship information describes relationships between a plurality of command templates, and the relationships described by the template relationship information comprises that two command lines having a same parent command line have a same working view, and wherein the relationships described by the template relationship information comprise a parent-child relationship between a first command line in a first command template and a second command line in a second command template, the parent-child relationship is represented by using a first tree structure, two first nodes in the first tree structure that have a connection relationship represent the first command line and the second command line, and based on a direction of the first tree structure, a command line represented by an anterior first node in the two first nodes is a parent command line, and a command line represented by a posterior first node in the two first nodes is a child command line;

generate a machine-readable management interface for the network device based on the knowledge corpus; and manage the network device based on the machine-readable management interface.

15. The non-transitory computer-readable storage medium according to claim 14, wherein the static dataset comprises one or more of the following: a configuration guide, a technical guide, a technical white paper, a design document, or command modeling data of the network device.

16. The non-transitory computer-readable storage medium according to claim 14, wherein the knowledge corpus further comprises command templates, and a command template describes a command for managing the network device.

17. The non-transitory computer-readable storage medium according to claim 16, wherein the command template comprises one or more of the following: a command name, a command line, a command function description, a configuration instance, a working view of the command line, a definition of a parameter in the command line, or a format of a disabling command line of the command line.

18. The non-transitory computer-readable storage medium according to claim 17, wherein the definition of the parameter comprises a function definition, a type constraint, and a value constraint of the parameter.

19. The non-transitory computer-readable storage medium according to claim 16, wherein the command template has a first check indicator, and the first check indicator indicates whether the command template has been checked.

20. The non-transitory computer-readable storage medium according to claim 14, wherein the relationships described by the template relationship information further comprise an association relationship in which a third command line in a third command template and a fourth command line in a fourth command template have a same field prefix.

* * * * *